United States Patent
Bhowmik et al.

(10) Patent No.: US 9,997,920 B2
(45) Date of Patent: Jun. 12, 2018

(54) SYSTEM AND METHOD FOR ISLANDING DETECTION AND PREVENTION IN DISTRIBUTED GENERATION

(71) Applicants: Shibashis Bhowmik, Charlotte, NC (US); Iman Mazhari, Charlotte, NC (US); Babak Parkhideh, Charlotte, NC (US)

(72) Inventors: Shibashis Bhowmik, Charlotte, NC (US); Iman Mazhari, Charlotte, NC (US); Babak Parkhideh, Charlotte, NC (US)

(73) Assignees: SINEWATTS, INC., Charlotte, NC (US); THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 301 days.

(21) Appl. No.: 14/860,159

(22) Filed: Sep. 21, 2015

(65) Prior Publication Data
US 2016/0013650 A1    Jan. 14, 2016

Related U.S. Application Data

(63) Continuation-in-part of application No. 14/737,468, filed on Jun. 11, 2015.
(Continued)

(51) Int. Cl.
*H02J 3/38*      (2006.01)
(52) U.S. Cl.
CPC .............. *H02J 3/381* (2013.01); *H02J 3/383* (2013.01); *H02J 2003/388* (2013.01); *Y02E 10/563* (2013.01)

(58) Field of Classification Search
None
See application file for complete search history.

(56) References Cited

U.S. PATENT DOCUMENTS 6,219,623 B1 * 4/2001 Wills .................. H02J 3/383
                                               290/40 B
6,268,666 B1    7/2001 Bhowmik
(Continued)

FOREIGN PATENT DOCUMENTS

WO    WO 2013/009877 A2    1/2013

OTHER PUBLICATIONS

Mazhari, et al., "Locking Frequency Band Exposure Method for Islanding Detection and Prevention in Distributed Generation", Energy Conversion Congress and Exposition (ECCE), 2014 IEEE, Sep. 14, 2014, pp. 4361-4366.
(Continued)

*Primary Examiner* — Jared Fureman
*Assistant Examiner* — James Evans
(74) *Attorney, Agent, or Firm* — K&L Gates LLP

(57) ABSTRACT

Various examples are directed to systems and methods for detecting an islanding condition at an inverter configured to couple a distributed generation system to an electrical grid network. A controller may determine a command frequency and a command frequency variation. The controller may determine that the command frequency variation indicates a potential islanding condition and send to the inverter an instruction to disconnect the distributed generation system from the electrical grid network. When the distributed generation system is disconnected from the electrical grid network, the controller may determine whether the grid network is valid.

4 Claims, 25 Drawing Sheets

Related U.S. Application Data

(60) Provisional application No. 62/010,518, filed on Jun. 11, 2014.

(56) References Cited

U.S. PATENT DOCUMENTS

| | | | |
|---|---|---|---|
| 6,853,940 B2 | 2/2005 | Tuladhar | |
| 7,016,793 B2 | 3/2006 | Ye et al. | |
| 7,116,010 B2 | 10/2006 | Lasseter et al. | |
| 7,427,815 B1* | 9/2008 | Ye | G01R 31/043 307/127 |
| 7,492,617 B2 | 2/2009 | Petter et al. | |
| 7,687,937 B2 | 3/2010 | Lasseter et al. | |
| 8,310,104 B2 | 11/2012 | Gengenbach et al. | |
| 8,334,618 B2 | 12/2012 | Bhavaraju et al. | |
| 8,423,312 B2 | 4/2013 | Krein | |
| 8,780,592 B1 | 7/2014 | Jones et al. | |
| 9,453,658 B2 | 9/2016 | Kreutzman | |
| 9,692,319 B1* | 6/2017 | Slavin | H02M 7/4807 |
| 2008/0122293 A1* | 5/2008 | Ohm | H02J 3/383 307/86 |
| 2011/0276192 A1* | 11/2011 | Ropp | H02J 3/383 700/293 |
| 2011/0309804 A1* | 12/2011 | Yasugi | F03D 7/0284 322/19 |
| 2012/0029716 A1* | 2/2012 | Sekoguchi | H02J 3/38 700/293 |
| 2013/0181527 A1 | 7/2013 | Bhowmik | |

OTHER PUBLICATIONS

Mazhari, et al., "Locking Frequency Band Detection Method for Grid-tied PV Inverter Islanding Protection", Energy Conversion Congress and Exposition (ECCE), 2015 IEEE, Sep. 20, 2015, 6 pages.

* cited by examiner

SYSTEM AND METHOD FOR ISLANDING DETECTION AND PREVENTION IN DISTRIBUTED GENERATION

CROSS-REFERENCE TO RELATED APPLICATIONS

This application is a continuation-in-part of U.S. patent application Ser. No. 14/737,468, filed on Jun. 11, 2015, which is incorporated herein by reference in its entirety and, which claims the benefit of priority to U.S. Provisional Patent Application No. 62/010,518, filed on Jun. 11, 2014, which is also incorporated herein by reference in its entirety.

STATEMENT REGARDING FEDERALLY SPONSORED RESEARCH/DEVELOPMENT

This invention was made with Government support under Award Number DE-EE0006459 by the Department of Energy. The Government has certain rights in the invention.

BACKGROUND

As distributed generation systems become part of the power grid, islanding is becoming an increased safety hazard for personnel and damage risk for grid-connected equipment. Islanding refers to a condition in which a distributed generator (DG) continues to power a segment of a distribution network or grid even though electrical grid power from the electric utility is no longer present. As shown in FIGS. 1A and 1B, the islanding phenomenon happens when the grid is intentionally or accidentally disconnected from the network and the DG continues to energize local loads. FIG. 1A shows a grid network 100 before islanding occurs and FIG. 1B shows a grid network 100 after islanding occurs. As seen from FIG. 1B, when an islanding condition exists, the main power system 102 is disconnected from the rest of the grid network 100 by the disconnection 104. The main power system 102, for example, may be a power source provided by a utility company, an electricity cooperative, permanent or semi-permanent generation, etc. When an islanding condition exists, as in FIG. 1B, the DG units 106 will feed the load 108 unless the DG units cease to generate power.

Aside from the danger to maintenance personnel arriving to service a circuit that is energized by DG systems, also called a feeder, there are also operational issues due to islanding. IEEE 1547-2003 standard stipulates a maximum delay of 2 seconds for detection on an unintentional islanding condition and all DG systems 106 are required to cease energizing the load network, which may be a power grid. The islanded system may also be insufficiently grounded by the interconnection inside the DG. Re-closure operations that are initiated by the utility to clear the fault or disconnection 104 may also cause large mechanical torques, along with currents, particularly at in-rush, which are harmful for equipment in the islanded network.

A common example of islanding may occur at a grid supply line that has one or more solar photovoltaic (PV) power plants or systems attached to it. In the case of a blackout, the solar PV systems will continue to deliver power as long as there is sufficient sunlight. In this case, the supply line becomes an "island" with power surrounded by a "sea" of unpowered lines. For this reason, inverters for solar PV systems and other distributed generation (DG) systems generally have some sort of automatic anti-islanding circuitry in them.

Islanding detection methods can be classified into two major groups: remote and local methods. Remote techniques are based on the communication between utilities and DG systems such as power line communication, and supervisory control and data acquisition that do not have non-detection zones (NDZ), but are expensive to be implemented and therefore uneconomical. NDZs are defined as a loading condition for which an islanding detection method is unable to detect islanding. Local techniques, which are related to the DG, can be classified into two major categories: passive and active methods. Passive methods are based on measuring local parameters of DG and comparing the parameters to a reference value. Some commonly applied passive methods are over/under frequency protection (OFP/UFP), over/under voltage protection (OVP/UVP), phase jump detection, voltage harmonic monitoring and change in grid impedance detection. While these methods are simple to implement, typically, they fail to detect islanding in one or more powering/loading condition(s) leading to NDZ(s) for these methods. NDZs exist for OVP/UVP or OFP/UFP methods when the inverter generated power closely matches that of the load and, for the phase jump detection method when the load power factor is unity.

Active methods strive to reduce the NDZs associated with typical passive methods by adding field quantities, such as voltage, current, perturbations to the inverter. Some active methods include: (i) Output power variation method requires multiple DG systems but it fails when synchronization is not met due to the averaging effect; (ii) Active frequency drift (AFD) method requires adding small increments/decrements in the frequency of the inverter output current while monitoring the frequency of the voltage. AFD fails to detect an islanding condition when the load phase angle matches the phase offset of the perturbation. Sandia frequency shift (SFS) method which is an active frequency adjustment improves the performance of the AFD method by adding positive feedback to adjust the frequency away from the nominal value faster than the AFD method. However, there remains a need for systems and methods that are cost effective and efficient at detecting whether an Islanding condition exists.

BRIEF DESCRIPTION OF DRAWINGS

Aspects of the present invention is further described in the detailed description which follows in reference to the noted plurality of drawings by way of non-limiting examples of example embodiments of the present invention in which like reference numerals represent similar parts throughout the several views of the drawings and wherein.

DETAILED DESCRIPTION

Figure 1A:
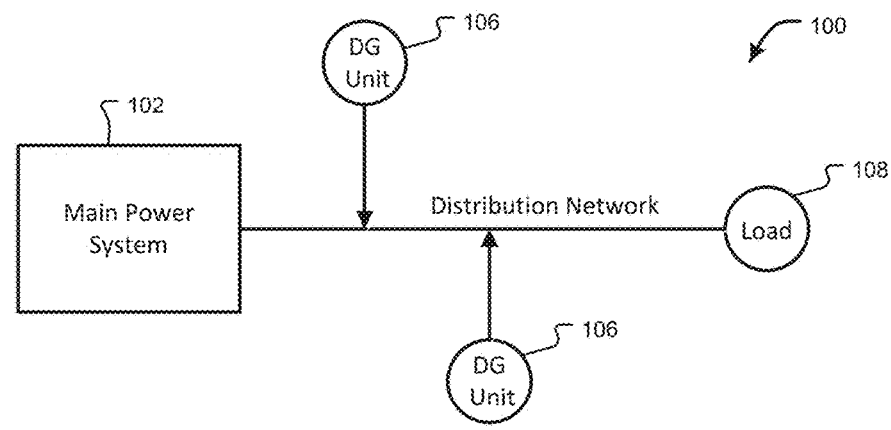
FIG. 1A is an illustration of a network before an islanding condition has occurred.
Figure 1B:
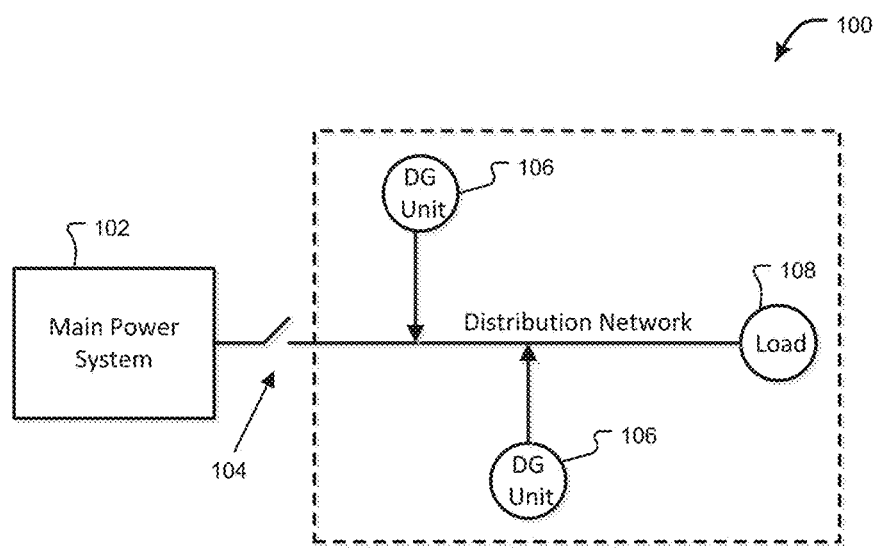
FIG. 1B is an illustration of a network after an islanding condition has occurred.

Various examples are directed to systems and methods that detect an islanding condition in a power grid, for example, at an inverter of a distributed generation (DG) system. A controller may generate a disturbance signal that is applied to the frequency command of the inverter of the DG system. This disturbance signal is often referred to here as the command frequency. The controller may monitor various properties of the command frequency to detect islanding conditions. In some examples, the controller may monitor variations in the command frequency. From the variations in the command frequency, the controller may determine whether an islanding condition exists, for example, as described herein. Also, in some examples described herein, the controller may detect islanding conditions by monitor other properties, for example, a phase of a signal at the Point of Common Coupling (PCC) where the inverter is coupled to the grid network. When an islanding condition is detected, the controller may disconnect the DG system from the power grid.

In various examples, a grid frequency is determined by the speed at which the generators in the generating plant run for a power grid. When the power demand exceeds the power generation, the grid frequency falls. Similarly, when power demand does not exceed generation, grid frequency may rise. Generally, grid frequency is maintained at a predetermine value such as, for example about 60 Hz in the United States. During conditions when the power demand on the grid matches very closely to that of generation, the grid frequency does not vary appreciably.

Some examples described herein include active methods for detecting and mitigating islanding conditions. Accordingly, controllers, as described herein, may be provided for creating a command frequency which is to be applied to the inverter of a DG system. DG systems may include any equipment that is capable of generating electricity at distributed locations on an electric grid. Example DG systems may include generators powered by one or more Photovoltaic (PV) cells (e.g., solar PV systems), wind, water, steam, fuel combustion, biomass, biogas, geothermal power, combinations thereof, etc. The controller may measure the variation of the command frequency. The measured variation may indicate the condition of the grid. If the controller detects that the command frequency has become constant, it may indicate that the grid has entered a tank condition of varying quality factor, as described herein and/or may indicate an islanding condition. A tank condition (sometimes referred to as a resonant tank condition) may occur when the main power source, which may be from a utility, is still connected, and the frequency variation of the power provided by the main power source is very small, such that it is between nominal values. A tank condition may also occur when the generated power from the DG system and the grid network (both active and reactive portions) closely matches the load, which may also comprise reactive components, such as motors and/or capacitor banks. The presence of reactive components results in a low power factor load, which, in turn provides for a tank condition having a quality factor that depends on the power factor.

In some examples of the present disclosure, the controller may generate the command frequency by receiving a sampled frequency at the PCC of an inverter of a DG system and adding to the sampled frequency some disturbance. Any suitable disturbance may be used including, for example, a constant, a polynomial signal, a linear signal, a noise signal, etc. Variations in the command frequency may indicate the condition of the power grid. For example, the controller may be programmed to recognize a power match between the DG system and the load to be served and determine whether the power match indicates a tank condition alone or an islanding condition (e.g., where the DG is disconnected from the grid power source). In some examples, the controller may discriminate between tank conditions and islanding conditions considering the system's behavior, as described herein. Example embodiments of the present disclosure for detecting the condition of a power grid have been shown to be robust, able to detect both tank conditions and island conditions (when present), and simple to be implemented. Relying only on frequency adjustment, may provide for a system that has minimal to no impact on the maximum power point tracking (MPPT) operation of a PV device(s) that operates as a DG system and that has a fast response to a determined condition of the grid.

In various examples described herein, the controller may detect a tank condition or an islanding condition by determining when the command frequency is locked within a frequency band for a threshold amount of time. This may be considered an active method compared with other common methods. The low cost due to the simplicity of implementation of various examples disclosed herein, not having the NDZ, and robustness are also highlighted advantages.

In some examples, the controller may detect islanding conditions differently based on whether generator and load capacity conditions are closely matched. For example, the controller may detect an islanding condition and turn-off or otherwise disconnect the DG system from the grid when the grid frequency (e.g. measured at the PCC) exceeds a frequency trip limit or otherwise falls outside of an acceptable frequency range. The frequency trip limit or frequency range may be based on the target grid frequency for the distribution system. The controller may also detect islanding conditions by monitoring variations in the command frequency. For example, when the generator and load capacity are closely matched, the grid frequency may remain within its acceptable range even though an islanding condition has occurred. Under closely-matched generator and load capacity conditions, however, the command frequency may remain locked below a threshold and/or within a locking frequency band. When a command frequency variation remains locked for a threshold time period, the controller may initiate a sequence of actions, described herein, to determine whether the generator and load conditions are matched due to a tank condition and/or due to an islanding condition. For example, the controller may disconnect the DG system and determine whether there is a grid outage (e.g., determine whether the main power system is active at the inverter). If there is a grid outage, the controller may determine that an islanding condition exists and may turn-off the DG system.

Utilizing the command frequency and variations in the command frequency, as described herein, the controller may distinguish islanding conditions from tank conditions in any suitable manner. This may reduce or, in some examples, even eliminate non-detection zones (NDZs) while also minimizing the impact of islanding condition detection on the power quality of the DG system. An NDZ may be a loading condition of the grid network for which an islanding detection method is unable to detect that the islanding condition is present.

In some examples, the controller may determine the command frequency, as described herein, and send the command frequency to an inverter of the DG system, as described herein. The controller may determine whether a command frequency variation is locked (e.g., whether it remains constant and/or within a locking frequency band for a threshold time period). In some examples, if the command frequency variation is locked, the controller may determine whether an islanding condition has occurred. For example, a constant command frequency may indicate a tank condition where the generator and load capacity conditions are closely matched and/or an islanding condition where the main power system is disconnected from the DG system. Accordingly, when a constant command frequency is detected, the controller may disable the DG system and measure zero voltage/current of the grid network. If a stable voltage and/or current at an acceptable frequency is present on the grid network after the DG system is disabled or disconnected, it may indicate that the main power system is active and the controller may reconnect the DG system to the grid network.

Example embodiments of the present disclosure comprise devices, equipment, methods, etc. for anti-islanding detection, such as active anti-islanding detection. In various examples, a command frequency is applied to the inverter of distributed generator, such as a solar Photovoltaic (PV) system. The controller may measure variations of the command frequency to determine a condition of the power grid. If the variations of the command frequency command become locked, as described herein, a tank condition and/or an islanding condition may have occurred. Also, according to some example embodiments of the present disclosure, it may be possible to discriminate between these two conditions, tank or islanding, based on the behavior of the command frequency, as described herein.

Figure 2:
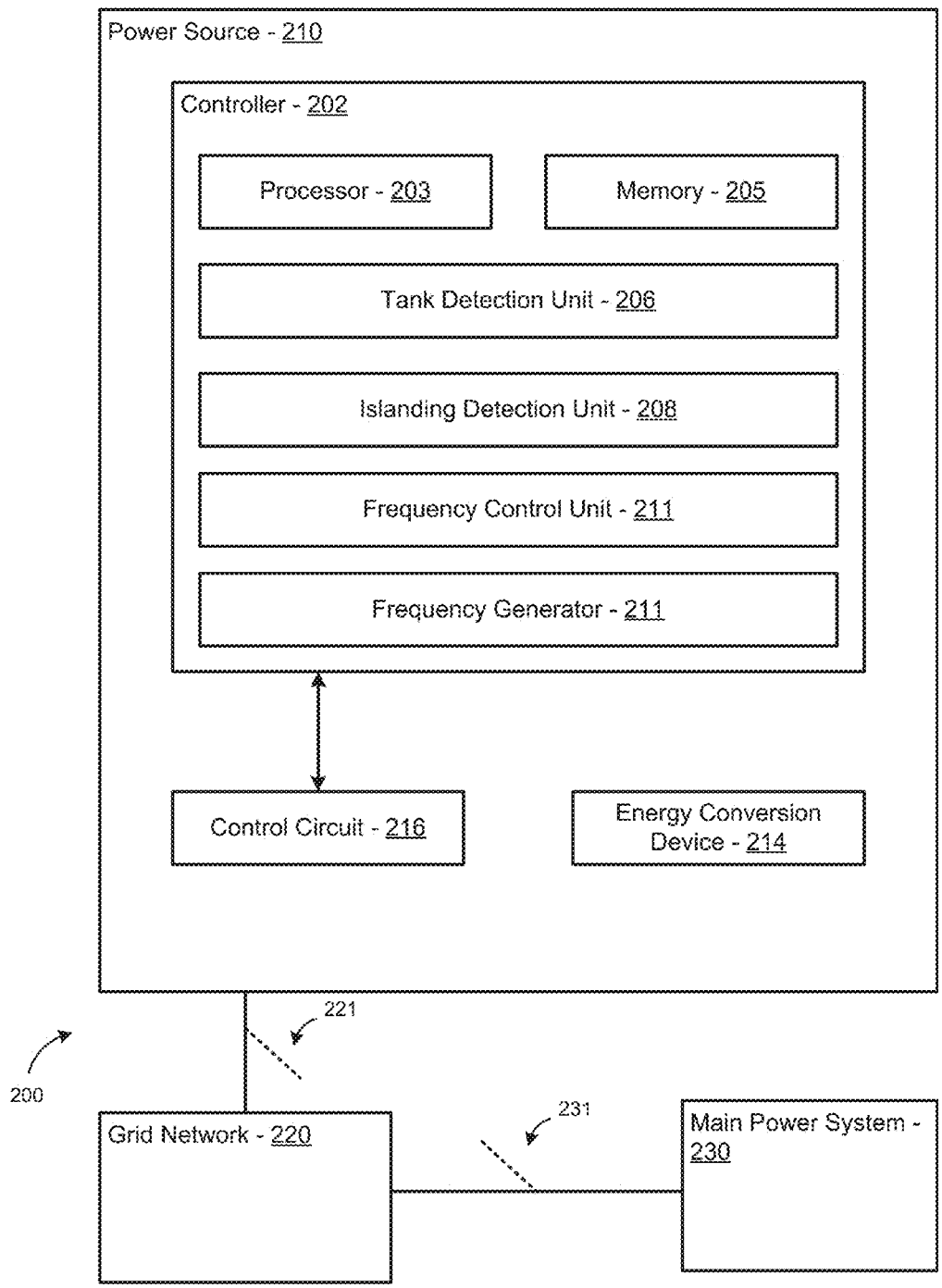
FIG. 2 illustrates one example of a system for detecting islanding conditions.

FIG. 2 illustrates one example of a system 200 for detecting islanding conditions. A grid 220 is connected to a main power system 230 and another power source 210. The main power system 230 may be a power source provided by a utility company, an electricity cooperative, permanent or semi-permanent generation, etc. Power source 210 may be a DG system. Power source 210 may comprise a controller 202. The controller 202 may comprise various components that are configurable and/or programmable to detect an islanding condition and thus control other components that are part of or are associated with the power source 210, such as connection 221, when an islanding condition is detected.

An islanding condition may occur when the main power system 230 has been disconnected to the grid a connection 231. Islanding conditions may occur for various reasons. For example, in islanding condition may be deliberate, for example, if a worker is working on the grid and has disconnected the power system 230. Islanding conditions may also be unintentional, for example, if a fault has occurred along a power line of the grid network 220, if the main power system 230 fails, etc. When an islanding condition occurs, the controller 202 may be programmed to disconnect the power source 210 from the grid network at 221 to prevent the power source 210 from applying power to the grid network 220. In some examples, the controller 202 may also be programmed to shut down or turn off the power source 210 to prevent it from generating further power while disconnected from the grid network 220. As described herein, some regulatory regimes may require that the power source 210 be disconnected from the grid network 220 within two seconds (or another suitable threshold time) of the occurrence of the islanding condition. According to various example embodiments, the connection 221 may comprise one or more switches that are sized appropriately for the parameters of installation. Such switches may be single or multiple phase switches, and may be specified to handle maximum voltage and/or maximum current expected at the connection 221. In some examples, the connection 221 and its constituent components may be part of the power source 210. The connection 231 may comprise one or more switches, switch, similar to the switch described in connection to 221.

Power source 210 may be any suitable distributed generation power source, as described herein. The power source 210 may include an energy conversion device 214 to convert non-electrical energy to electrical power. Example conversion devices 214 include photovoltaic cells, wind mills, internal combustion engines, fuel cells, geothermal elements, etc. Electrical power from the energy conversion device 214 may be provided to a control circuit 216 and the electrical power then is sent to the grid 220. For example, the control circuit 216 may comprise an inverter for the distributed generator, microprocessors, microcontrollers, associated analog and digital control circuits, etc., for processing power generated by the power source 210 to the grid 220.

Controller 202 may be connected to the control circuit 216 and may include various components for implementing examples of the islanding detection described herein. A processor 203 may be configured to perform various operations of the controller, as described herein. A memory 205 may include any suitable type of data storage hardware. The memory 205 may be in communication with the processor 203. Various other units 206, 208, 211, and generators 212 may be implemented in hardware or may be implemented with software executed by the processor.

A frequency generator 212 may generate the command frequency applied to the control circuit 216 and its constituent inverter. The frequency generator 212 may comprise various hardware for generating the command frequency including, for example, an LC circuit, etc. Other example hardware for generating the command frequency may include one or more processors (e.g., digital processors) configured to generate the command frequency based on filtered frequency measures of the grid and injected disturbances, as described herein. According to example embodiments, the frequency measured from the grid (e.g., the grid frequency) may be different than the command frequency. Additionally, if the command frequency is locked within a threshold range, as described herein, this condition may indicate a tank condition and, and, if the grid network is not active, an islanding condition.

A frequency control unit 211 may control the command frequency of the signal applied to the grid 220 by the power source 210, for example, as described herein below. The frequency control unit 211 may be implemented utilizing hardware, software, or a combination of hardware and software. In some examples, the frequency control unit 211 may comprise software executed by the processor 203 in conjunction with the memory 205. The frequency control unit 211 may cause the processor 203 (or other hardware component) to modify the frequency generator 212 to generate a desired command frequency. For example, the frequency control unit 211 may send a signal to increase or decrease the command frequency of the signal applied to the grid 220.

The controller 202 may also include a tank detection unit 206 that performs operations discussed herein to detect a tank condition. The tank detection unit 206 may be implemented in hardware or, in some examples, may be comprise software to be executed by the processor 203. In some examples, the tank detection unit 206 is configured to determine when variations in the command frequency are locked, as described herein. The controller 202 may also include an island detection unit 208 that performs operations discussed herein to detect islanding conditions. The islanding detection unit 208 may be implemented in hardware or, in some examples, may comprise software to be executed by the processor 203. In some examples, the islanding detection unit 208 may be configured to distinguish between tank conditions where the power source 210 is still connected to the main power system 230 through the grid network 220 and tank conditions where an islanding condition exists. For example, the islanding detection unit 208 may be programmed to instruct the control circuit 216 (and its constituent inverter) to disconnect the power source 210 from the grid network 220 and determine whether the main power system 230 is active and connected to the grid network 220, as described herein.

Figure 3:
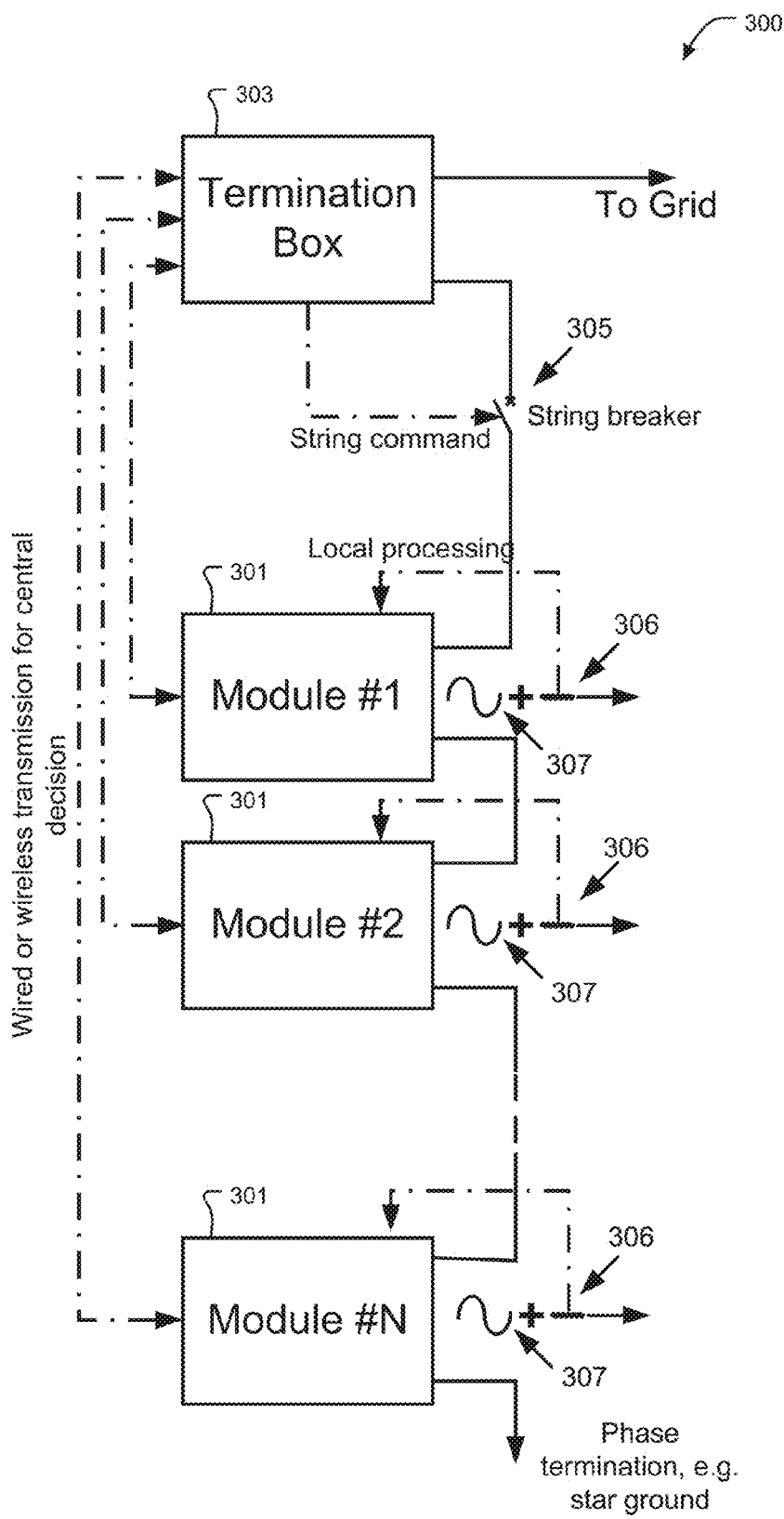
FIG. 3 shows one example of a configuration to implement aspects of an anti-islanding systems and methods.

FIG. 3 shows one example of a configuration to implement aspects of an anti-islanding systems and methods. The configuration shown in FIG. 3 may comprise series-connected AC-stacked inverters 301. In the configuration 300 shown in FIG. 3, inverters 301, which may be individual inverters coupled to distributed generation sources, such as PV panels, are connected together in series and are then coupled to a termination box 303, which is connected to a power grid. According to various example embodiments, the inverter may reside on the back of a PV panel. In some examples, some or all of the inverters (e.g., inverters 301) may have form factors that are about the size of a business card. As shown in FIG. 3, the configuration 300 shows that the inverters 301 are series connected, however, in other example embodiments one or more of the inverters 301 may be connected in parallel to another inverter 301.

In some examples, the configuration 300 may include bypass mechanisms to be used in the event that a inverter 301 goes bad and a path around must be provided. According to one example embodiment, up to ⅓ of the number of modules in a configuration of modules may be bypassed, for example if they malfunction. Each inverter 301 may be configured to produce a small voltage and the inverters 301 are coupled together to connect to the grid. Thus the inverters 301 share the burden of connecting to the grid in a segmented manner. The number of inverters 301 employed in a particular configuration may be based on a particular power requirement and/or a particular voltage requirement. Additionally, a group of inverters 301 may be employed as a configuration in a distribution or transmission setting, and/or in a residential or industrial setting. In one example embodiment, each inverter 301 generates a main waveform 307, which may be compliant with IEEE 519 that is fed back into the inverters 301. The main waveform 307 is ultimately applied to the grid that the configuration is connected to. For example, the main waveform 307 may exhibit the command frequency, as described herein. In some examples, the configuration 300 may be part of a DG system, as described herein. For example, the inverters 301 and termination box 303 may make up all or part of an inverter whose control unit may include part or all of the controller 202 and control circuit 216 described with respect to FIG. 2.

In some examples, in addition to the main waveform 307, each inverter 301 may also generate a random or controlled noise 306. The random or controlled noise 306 may be generated with an amplitude that is reduced (e.g., significantly reduced) as compared to the main waveform 307. The information of the noise 306 at each inverter 301 may be compiled at a central location, such as at the termination box 303. In one example embodiment, the compilation may be performed locally, and may be accomplished via a local controller coupled to the inverters 301. The random or controlled noise 306 may be utilized to generate the command frequency, for example, as described herein. For example, the command frequency may be the frequency of the waveform generated by the algebraic sum (or a fraction of) the main waveform and the generated noise 306. A central controller may be located, for example, at the termination box 303. Additionally in another example, the determination of a tank and/or islanding condition at each inverter 301 may be performed remotely, for example by a remote controller at a power generation source, such as a power plant. The result of islanding and/or tank condition detection may be a flag or similar signal that is transmitted from each inverter 301 to a central location at the power generation source, such as a plant, or a central location coupled to the inverters 301, such as termination box 303. The transmission of the flag or similar signal can be accomplished wirelessly or wired separately, or also may be accomplished via a transmission on the power line.

The local controller may receive and compile all flag or similar signals from the inverters 301 and send out the necessary commands to a string breaker 305, for example, to disconnect the modules from the grid, for example, when an islanding condition is detected or is to be tested for. In some examples, the string breaker 305 may be replaced with a suitable relay (electro-mechanical or otherwise). In one example, the local controller, which may be located in the termination box 303, may listen to all the flag signals and take action if there is a consensus among the modules. An action by the local controller may include controlling the string breaker 305 to open and disconnect the inverters 301 from the grid. Additionally, the inverters 301 may be configured such that they act autonomously and coordinate among themselves to connect to the grid. For example, each inverter 301 comprises and/or service a power source, such as the power source 210 described herein. Each inverter 301 may individually determine the presence or absence of an islanding condition, as described herein. Individual islanding condition detections may be aggregated at the local controller in any suitable manner with results provided to the termination box 303.

In other examples, additional string breakers may be included in between each inverter 301 or at locations between a predetermined number of inverters 301. Further, in additional example embodiments the inverters 301 coordinate among themselves autonomously such that no control communication is required to be provided to the modules such that for the inverters 301 to operate together, there is no need for a control communication to be provided to the modules. Further details regarding an example architecture comprising a plurality of nodes is disclosed in U.S. Patent Application Publication No. 2013/0181527, which is herein incorporated by reference in its entirety.

Figure 4:
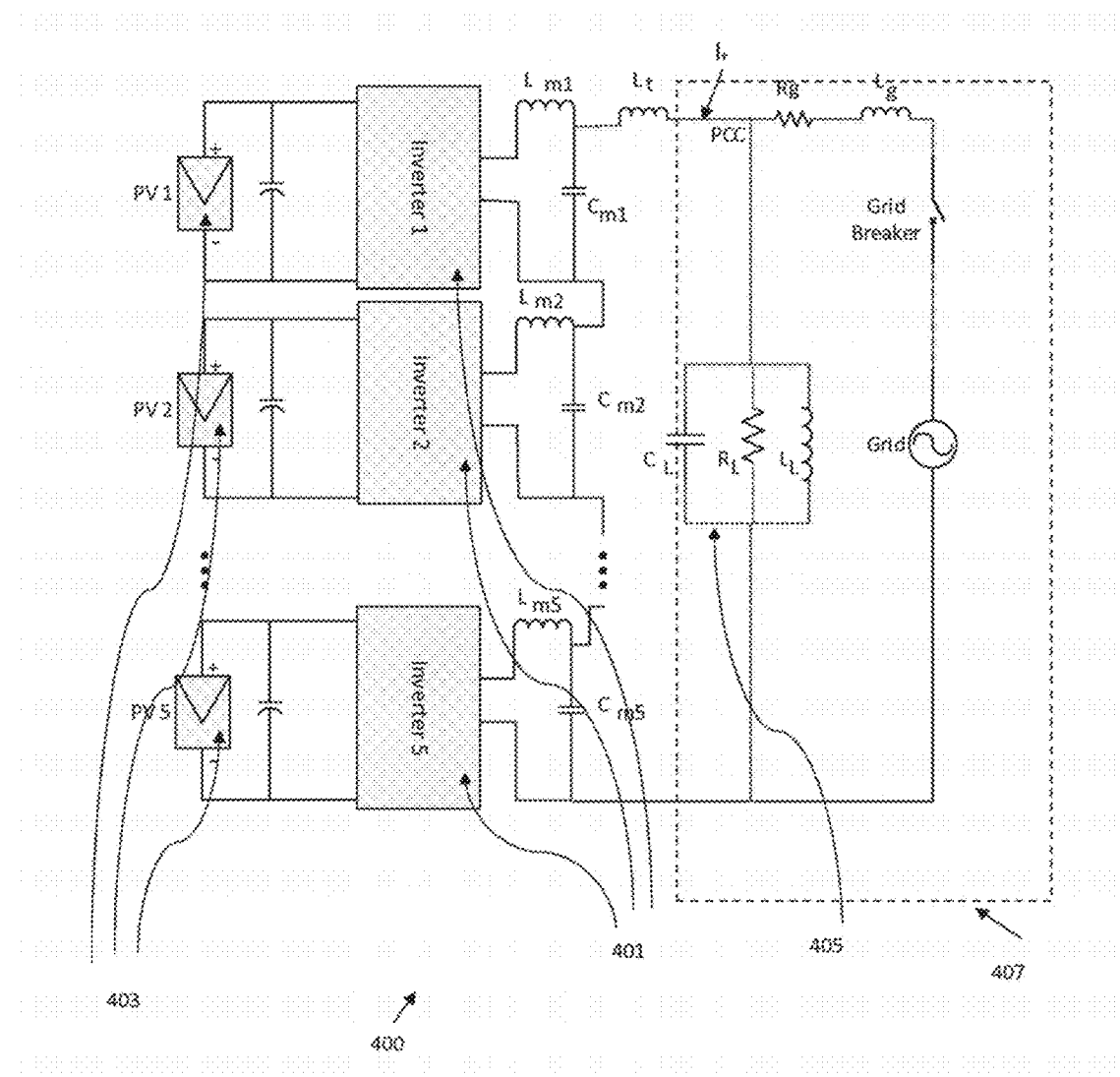
FIG. 4 shows one example of a system for detecting islanding conditions.

FIG. 4 shows one example of a system 400 for detecting islanding conditions 401. For example, the inverters 401 may be series-connected AC-stacked inverters. The system 400 may be a solar PV system. The system 400 may comprise photovoltaic (PV) power sources 403 (also labeled as "PV1", "PV2" . . . "PV5"). The PV power sources 403 may comprise one or more photovoltaic cells. The PV power sources 403 may act as a series of power generators and may each be connected to the power grid in parallel. The number of PV power sources 403 in any particular example of the system 400 may vary depending on desired loading and/or voltage conditions. Additionally, each photovoltaic source 403 may be connected to a respective inverter 401 which controls the output of power from the photovoltaic source 403 to the power grid 407. The inverter 401 may be part of a control circuit of the power source 403, similar to that described with regard to the control circuit 216 of FIG. 2. It should be noted that other devices may be used in between the power source and the grid, and the present disclosure should not be limited to an inverter for this function and any component performing the functions of the inverter described herein may be used. Also, some or all of the photovoltaic sources 403 and/or inverters 401 may be associated with one or more controllers, such as the controller 202, for detecting islanding conditions as described herein (not shown in FIG. 4). Also, although photovoltaic power sources 403 are shown in FIG. 4, the configuration of FIG. 4 may be used with any other suitable type of distributed generation source, as described herein. FIG. 4 shows current $I_t$, which may be the current waveform having a frequency that is defined as the command frequency according to example embodiments of the present disclosure. Current $I_t$ is the current provided by the each of the inverters 401 based on the PV power sources 403. The power sources 403 and their respective inverters 401 may be connected to the grid at the PCC along with a load represented in FIG. 4 as the RLC circuit 405.

Figure 5:
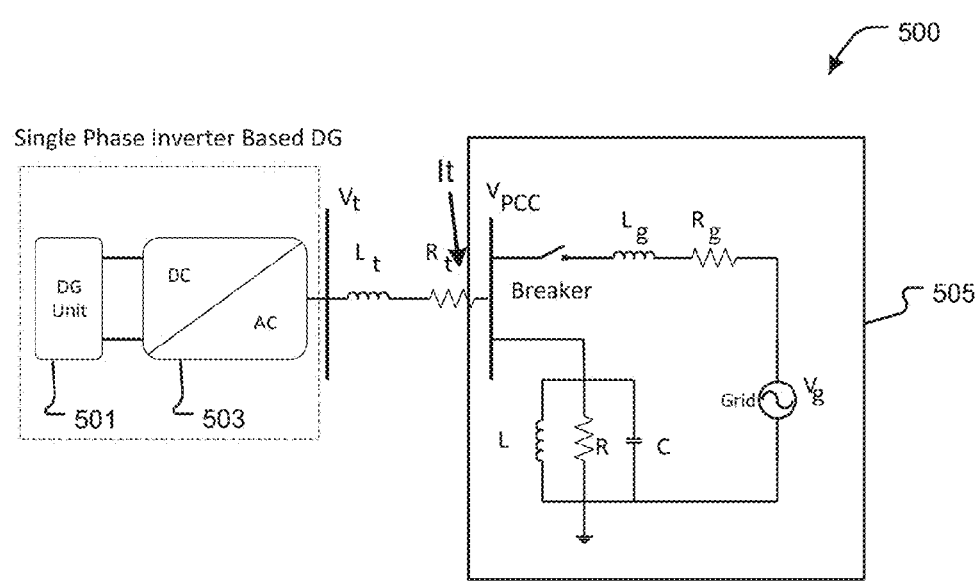
FIG. 5 shows one example of a system used for islanding detection that comprises a distributed generator and associated inverter connected to a grid.

In some examples, the system 400 may be applied with multiple power sources and multiple inverters, but it should be recognized that any number of power source/inverter combinations may be possible. For example, FIG. 5 shows one example of a system 500 used for islanding detection. The system 500 may comprise a distributed generator unit 501 connected to a grid network 505 via a single-phase inverter 503. As illustrated, the grid network 505 comprises an LRC load. In some examples, the distributed generator unit 501 and inverter 503 may be in communication with a controller for detecting islanding conditions, for example, as described herein. Similar to FIG. 4, FIG. 5 shows current $I_t$, which may be the current waveform having a frequency that is defined as the command frequency according to example embodiments of the present disclosure. Current $I_t$ is the current provided by the inverter 503 based on the DG unit 501.

Figure 6:
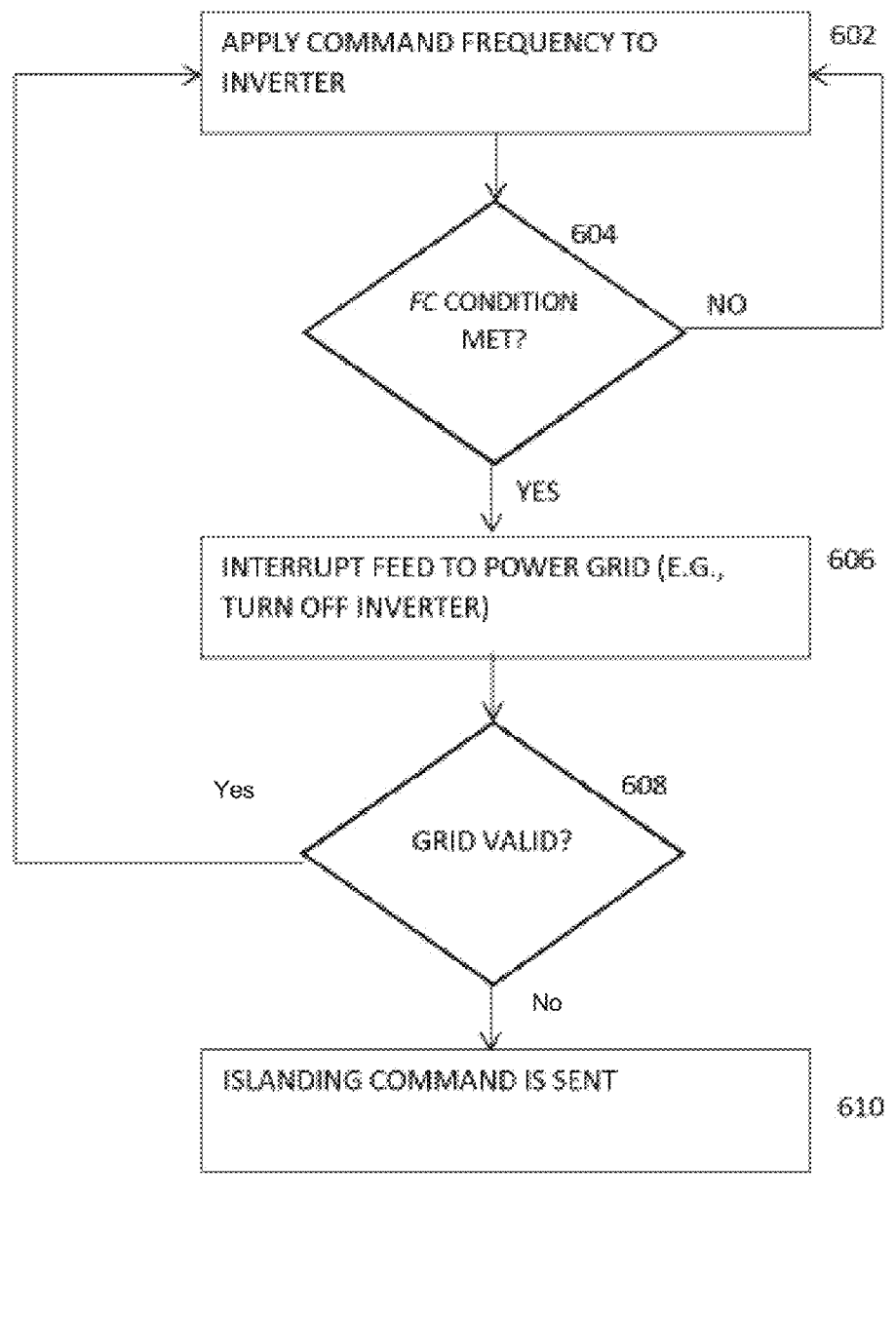
FIG. 6 is a flowchart showing one example of a process flow that may be executed by a controller to detect an islanding condition.

FIG. 6 is a flowchart showing one example of a process flow 600 that may be executed by a controller to detect an islanding condition. At block 602, the controller, or other suitable component, may send a command frequency to an inverter or similar hardware connecting a DG system to a power grid, such as the examples described in FIGS. 2-5. The inverter may be coupled to the DG system and the power grid and may provide power from the DG system to the power grid. For example, the command frequency may be applied to a waveform output by the inverter. In various examples, the command frequency may be determined, for example, as described herein with respect to Equations [1]-[3]. The waveform may be a current waveform, a voltage waveform, or a phase of the current or voltage waveform applied by the inverter to the power grid. For example the waveform may be the algebraic sum or other appropriate mathematical function of the waveforms 306 and 307 described herein in FIG. 3.

At block 604, the controller may determine whether the command frequency meets one or more conditions suggesting that a tank and/or islanding condition is present. These conditions may include those described herein including, for example, when the command frequency variation is locked, when the command frequency variation is consistently positive or negative for a threshold time period or number of samples, when the command variation is within an inner and an outer frequency band, etc. As described herein, the command frequency variation may be locked if it remains constant and/or within a locking frequency band for a threshold time period (e.g., 1.5-1.7 seconds), when a change in the command frequency is non-zero, etc. Examples of the one or more conditions are described herein. If the one or more conditions are not met at block 604, the controller may continue to apply the command frequency at block 602. If the one or more conditions are met, then controller may, at block 606, instruct the inverter to disconnect the power supply from the grid. This may be accomplished by switching the inverter to an off state or disconnecting the inverter, and the hence the power source, from the power grid.

At block 608, the controller may determine is made whether the grid network is valid (e.g., whether a main power system is active and connected at the inverter through the grid network). Accordingly, the voltage and/or current of the grid network may be measured to determine if an islanding condition is present. The grid network may be valid if grid network properties, such as voltage, current, frequency, etc. fall within certain threshold values. For example, with the inverter disconnecting the DG system from the grid network, the controller may determine, for example, if the grid network voltage is within a threshold of a rated voltage of the grid network, whether a grid frequency is within a threshold of the rated frequency for the grid network, whether a grid network power factor is within a threshold of a rated power factor for the grid network, etc. Different grid network properties may have different threshold values. Any suitable criterion or criteria may be used to determine if the grid network is valid. In some examples, the grid network may be considered invalid if even one grid network property is outside of its respective threshold. In other examples, the grid network may be considered valid even if a limited number of grid network properties are outside of their respective threshold or thresholds.

If the grid network is not valid, it may indicate that an islanding condition is present. If the grid is not valid (e.g., an islanding condition is detected), an islanding command may be sent at block 610 to an inverter or inverters of the distributed generation source to disconnect the distributed generation source from the grid. If an islanding condition is not detected, the power supplied by the inverter from the power source to the power grid is reconnected. According to example embodiments, this is automated process performed by the control circuit of the power source. In various examples, the process flow 600 may be executed within the period during which a distributed generation unit is required to detect an islanding condition by applicable regulations. In some examples, described above, this period is two (2) seconds. In some examples, the length of time necessary to execute the process flow 600 may be tuned by changing various factors such as, for example, the threshold time for determining a locked command frequency variation, etc. In some examples, the process flow 600 may be utilized in conjunction with an over/under frequency protection circuit (OFP/UFP) that compares the command frequency to a threshold frequency range for the grid network (e.g., $(59.3 < f_c < 60.5)$). When the command frequency falls outside the threshold frequency range, the controller may detect an islanding condition and disconnect the distributed generator from the grid. The OFP/UFP, however, may not detect islanding conditions when the load and power on the grid are closely matched. In these situations, the process flow 600, executed by the controller, may detect islanding conditions as described herein.

Figure 7:
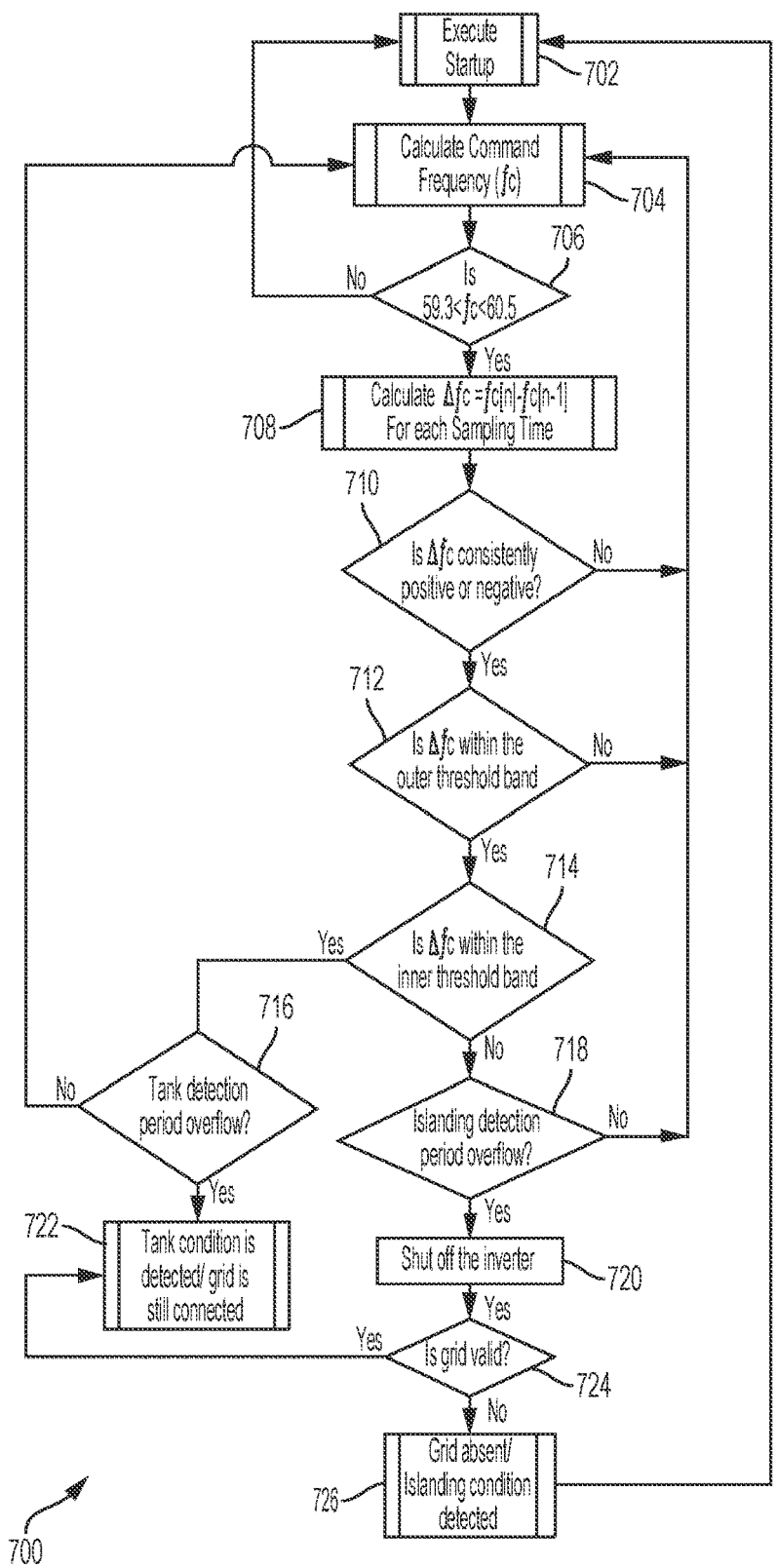
FIG. 7 is a flow chart showing one example of a process flow that may be executed by a controller to detect islanding conditions.

FIG. 7 is a flow chart showing one example of a process flow 700 that may be executed by a controller to detect islanding conditions. In some examples, the controller may periodically sample various values from the inverter, the grid network, or other components. Example values that may be periodically sampled include the grid frequency, grid voltage, grid current, etc. Any suitable sampling frequency may be used including, for example, every electrical cycle, every zero cross, etc. For example, on grid networks that operate at 60 Hz, sampling at every electrical cycle would result in a 60 Hz sampling rate while sampling at every zero cross would result in a 120 Hz sampling rate. Similarly, on grid networks that operate at 50 Hz, sampling at every electrical cycle would result in a 50 Hz sampling rate while sampling at every zero cross would result in at 100 Hz sampling rate. Various equations and description here describe measured values (such as grid frequency) and derived values (such as command frequency, command frequency variation, etc.) in terms of samples, referred to here as n. Accordingly, a grid frequency f[n] may be the grid frequency at a particular sample, n. The grid frequency f[n−1] may be the grid frequency at the sample immediately prior to n. Similarly, a command frequency $f_c$[n] may be the command frequency derived relative to a particular sample, n.

Referring again to the process flow 700, at 702, the controller may execute a startup routine. According to example embodiments, the controller may be the same or similar to the controller 202 referred to in FIG. 2. According to the start-up routine, the power source may make preparations to provide power to the grid. At block 704, the controller may calculate the command frequency, for example, as described herein. In some examples, a filtered frequency or filtered grid frequency F[n] may be found by filtering the sampled grid frequency f[n]. Any suitable filter may be used including, for example, an infinite impulse response (IIR) filter or other suitable digital filter. An example for finding the filtered frequency (F[n]) using an IIR digital filter is shown in Equation [1] below:

$$F[n] = \frac{K-1}{K} F[n-1] + \frac{1}{K} f[n] \quad [1]$$

In Equation [1], F[n] is the filtered frequency, F[n−1] is the filtered frequency calculated at the previous sample (e.g., n−1), f[n] is the grid frequency, and K is a constant chosen based on a desired system response time. In some examples, K may be an integer greater than one. A deviation of frequency $\epsilon_f$[n] may describe a difference between the grid frequency and the filtered frequency. An example equation for finding the deviation of frequency is provided by Equation [2] below:

$$\epsilon_f[n] = f[n] - F[n] \quad [2]$$

The command frequency $f_c$[n] of the inverter may be found considering $\epsilon_f$[n] as shown by Equation [3] below:

$$f_c[n] = F[n] + \alpha \epsilon_f[n] \quad [3]$$

In Equation [3], α may be a constant integer, typically, greater than 1 and may be used to determine the rate at which the command frequency is adjusted. In some examples, α may represent the amplification of the error or disturbance or noise added to the command frequency, such as the noise 306 described herein. For example, α may be a constant, a polynomial signal, a linear signal, a noise signal, etc. Also, although the command frequency is shown to be calculated in terms of the difference between the filter frequency and the grid frequency (e.g., $\epsilon_f$[n]), any suitable random or controlled noise may be used in place of $\epsilon_f$[n].

The command frequency may vary, for example, if the load is not matched with the generating power in such a way that the command frequency is increased if the load is greater than the generating capacity and is decreased if the load is less than the generating capacity. Consequently, using an over/under frequency protection circuit (OFP/UFP) with setting some threshold limit ($59.3 < f_g < 60.5$) islanding can be detected when the frequency exceeds the limit. For example, an over/under frequency protection circuit may be used in addition to the process flows described herein. The OFP/UFP may detect islanding conditions that occur when there is not a match between the load and the generating power. The OFP/UFP, however, may have a non-detection zone (NDZ) in a stable grid when the load exactly or closely matches the generating capacity. Such a non-detection zone may be described by Equations [4]-[6] below:

$$f[n] = f[n-1], F[n] = F[n-1] \quad [4]$$

$$F[n] = f[n], \epsilon_f[n] = 0 \quad [5]$$

$$f_c[n] = f_c[n-1] \quad [6]$$

In equations [4]-[6], n may refer to a sample of the indicated frequency or other value. For example, the controller may periodically sample various values When the grid frequency is stable due to the load-generator capacity match, the command frequency of the inverter also remains constant and the variation of the command frequency is zero. When the grid frequency is stable, but has some small deviation from the rated frequency, it may indicate that an islanding condition is possible but may or may not exist, as described herein. Such a condition may occur, for example, when the grid is operating with 60.1 Hz while the rated frequency is 60 Hz. Likewise, for an unstable grid, $f_c[n] \neq f_c[n-1]$, or in other words, the frequency command of the inverter varies if the grid frequency is unstable. When an islanding condition occurs, the command frequency variation, $\Delta f_c$, may be locked in a value because it has lost frequency information from the grid. After operating a few cycles in this mode with observing the locked command frequency, grid disconnection can be verified, and the final islanding command will be sent and the system will forego reconnecting the power source to the grid, as described herein.

Referring back to FIG. 7, once the command frequency is calculated, at block 706 the command frequency may be compared to an initial frequency range to determine if it is within that range. For example, the controller may determine if the command frequency is outside of a threshold frequency range of the grid network (e.g., 59.3 Hz-60.5 Hz). If the command frequency is outside of the threshold frequency range, it may not be applied to the inverter and therefore the grid. Instead, the controller may return to startup at block 702 where the power source and inverter remain disconnected from the power grid. The threshold frequency range, in some examples, may be selected based on the rated frequency of the grid network. For example, systems in the United States may utilize a threshold frequency range of between 59.3 Hz and 60.5 Hz based on the standard for the frequency variation allowed for power systems in the United States. Other ranges of frequencies may be chosen as appropriate, for example based on the rated frequency range of the grid network being used. If the command frequency does fall within the initial range at block 706, then the command frequency may be applied to the inverter and the distributed generation source connected to the grid. A value, $\Delta f_c$, may be calculated at block 708, for example, as described herein above with respect to Equations [1]-[3]. For example, $\Delta f_c$ may be found using Equation [7] below:

$$\Delta f_c = f_c[n] - f_c[n-1] \qquad [7]$$

The controller may calculate $\Delta f_c$ for each sampling time. Upon calculating $\Delta f_c$ at block 710, the controller may determine whether $\Delta f_c$ is consistently positive or negative. For example $\Delta f_c$ may be considered to be consistently positive if it is above zero for a threshold time and/or a threshold number of samples. Similarly, $\Delta f_c$ may be considered consistently negative if it is below zero for a threshold time and/or for a threshold number of samples.

If the controller determines that $\Delta f_c$ is not consistently positive or negative, for example, if it is alternating in polarity, then the controller may return to 704 and continue to calculate the command frequency. If the controller determines that $\Delta f_c$ is consistently positive or negative, this may used as a proxy for the $\Delta f_c$ being zero (applying a hysteresis band around zero). The controller may proceed to 712. At 712, the controller may determine whether $\Delta f_c$ is within an outer threshold band at block 712. Any suitable outer threshold band may be chosen including, for example, 0.5 Hz. If $\Delta f_c$ is not within the outer threshold band, the controller may again return to 704 and continue to calculate the command frequency. If $\Delta f_c$ is within the outer threshold limit in block 712, then, at block 714, the controller may determine whether $\Delta f_c$ is within an inner threshold band in block 714. Any suitable inner threshold band may be chosen including, for example, 0.2 Hz. If the controller determines that $\Delta f_c$ is not within an inner threshold limit in block 714, the controller may return to 704 and continue to calculate the command frequency. If the controller determines that $\Delta f_c$ is within an inner threshold band in block 714, the controller may determine whether the islanding detection period is in overflow at block 718. If the islanding detection period is not in overflow, then the controller may return to 704 and continue to calculate the command frequency. If the islanding detection is in overflow (e.g., more than an islanding detection period has passed), the inverter may be disconnected from the grid at block 720. The islanding detection period may be, for example, less than two seconds. The controller may determine, at block 724, whether the grid is valid. This can be determined based on whether the grid, at the inverter, is providing a current or voltage from a main power source that is normally feeding the grid. The main power source may be a power source that is provided by a utility, an electric cooperative, or any other entity as appropriate and as described herein. If the grid is determined not to be valid at 724, then it is determined that an islanding condition has occurred and the grid is absent from the connection with the inverter.

Referring again to 714, if $\Delta f_c$ is within both the inner and outer threshold bands, the controller may determine at block 716 whether a tank detection period overflow has occurred (e.g., whether a tank detection period has passed since start-up). If yes, the controller may proceed to a tank condition/no islanding state at 722. In some examples, performing the tests on the command frequency demonstrated in FIG. 7 may allow the controller to differentiate between islanding conditions and other situations where the $\Delta f_c$ is constant. This may eliminate unnecessary disconnections of the inverter, which can disrupt power. In some examples, A "tank" condition, as described herein, may occur when the command frequency is considered to be constant, nonzero value, but it may some small deviation from the rated frequency, which is shown in FIG. 7 as being between 59.3 Hz and 60.5 Hz. For example, when the grid is operating with 60.1 Hz while the rated frequency is 60 Hz, the system may determine that a tank condition has occurred. Likewise, for an unstable grid, $f_c[n] \neq f_c[n-1]$ or, in other words, the frequency command of the inverter varies if the grid frequency is unstable. When an islanding condition occurs, the frequency command variation may be ($\Delta f_c$) locked at a value because it has lost the frequency information from the grid.

Figure 8:
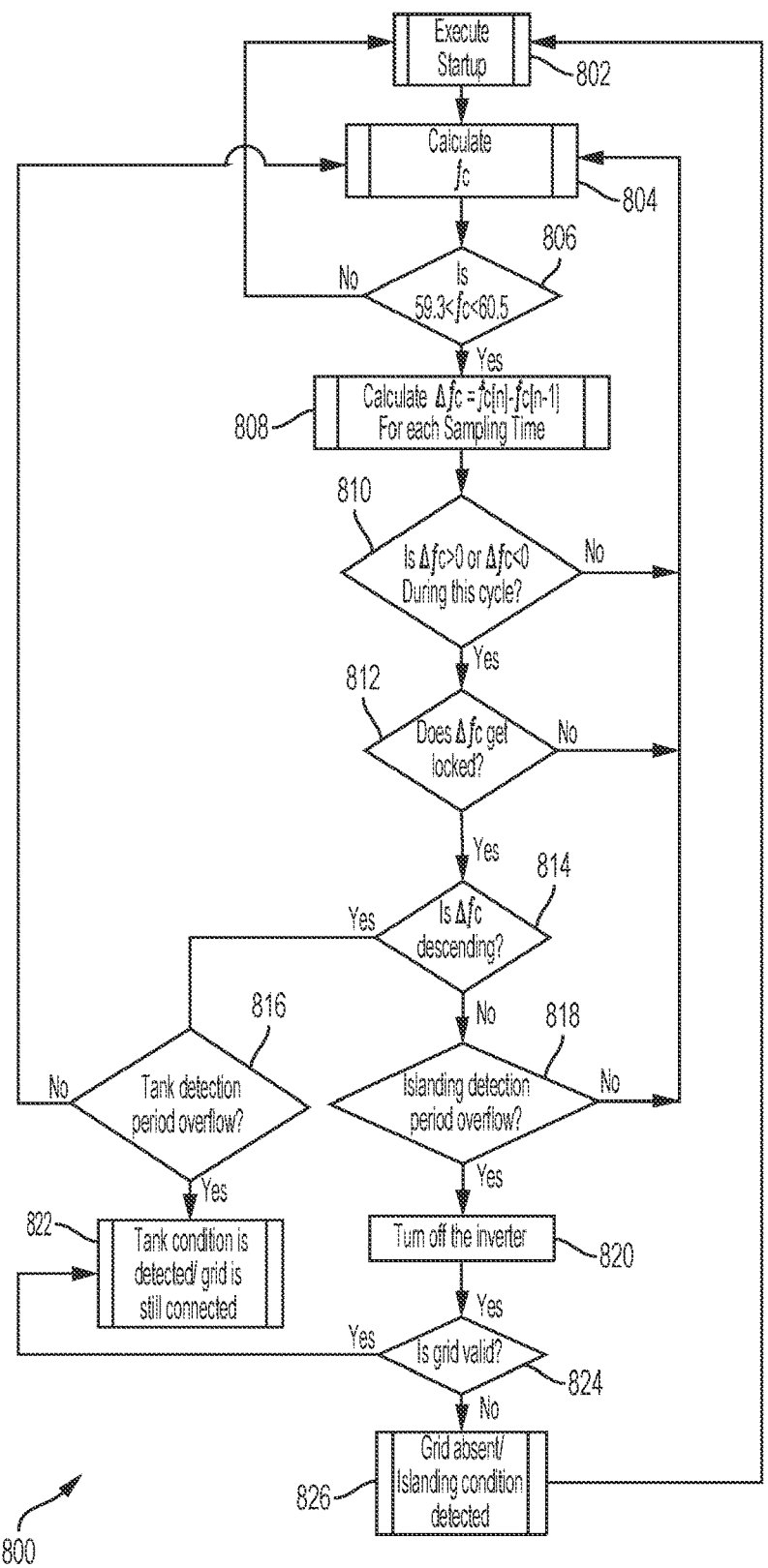
FIG. 8 is a flow chart showing an example of another process flow that may be executed by the controller to detect islanding conditions.

FIG. 8 is a flow chart showing an example of another process flow 800 that may be executed by the controller to detect islanding conditions. At block 802, the controller may execute a startup routine. According to the start-up routine, the power source may make preparations to provide power to the grid. At block 804, the controller may calculate the command frequency, for example, as discussed above with regard to FIG. 7. Once the command frequency is calculated, at block 806 the command frequency is compared to an initial range to determine if it is within that range.

As shown in FIG. 8, a comparison is made to determine if the command frequency is between 59.3 Hz and 60.5 Hz. For example, if the command frequency is outside of the rated range of the grid (e.g., 59.3 Hz-60.5 Hz), it may not be applied to the inverter and therefore the grid. Instead, the controller may return to startup at block 802 where the power source and inverter remain disconnected from the power grid. The values 59.3 Hz and 60.5 Hz are chosen based on the standard for the frequency variation allowed for power systems in the United States. Other ranges of frequencies may be chosen as appropriate, for example based on other countries and/or load setting, such industrial versus residential. If the command frequency does fall within the initial range, then the command frequency may be applied to the inverter and the distributed generation source is connected to the grid. A value of the command frequency variation, $\Delta f_c$, may be calculated at block 808, for example, as described herein above with respect to Equations [1]-[3]. The controller may calculate $\Delta f_c$ as $f_c[n] - f_c[n-1]$ for each sampling time.

Upon calculating $\Delta f_c$ at block 808, the controller may determine, at block 810 whether $\Delta f_c$ is greater than or less than 0 for a threshold time, for example one or more cycles of the grid frequency, and/or a threshold number of samples. If the controller determines that $\Delta f_c$ is not greater than or less than 0, then the controller may return to 804 and continue to calculate the command frequency. If the controller determines that $\Delta f_c$ is greater than or less than 0, and hence not zero, the controller may proceed to block 812. At block 812, the controller may determine whether $\Delta f_c$ has been locked in a value. For example, $\Delta f_c$ may be locked if it remains constant for a threshold time or number of cycles. In some examples, the threshold may be 1.5 seconds. If the controller determines that $\Delta f_c$ is not locked in a value, then the controller may again return to 804 and continue to calculate the command frequency. If the controller determines that $\Delta f_c$ is locked in value, then the controller may proceed to block 814 and determine whether $\Delta f_c$ is decreasing in value.

If at block 814, $\Delta f_c$ is not determined to have a decreasing value, the controller may determine whether the islanding detection period is in overflow, at block 818 (e.g., whether the islanding detection period has elapsed since startup). If the islanding detection period is not in overflow, then the controller may return to 804 and continue to calculate the command frequency. If the islanding detection is in overflow (e.g., more than an islanding detection period has passed), the inverter may be disconnected from the grid at block 820. The controller may determine at block 824 whether the grid is valid. This can be determined based on whether the grid is providing a current or voltage from a main power source that is normally feeding the grid. The main power source may be a power source that is provided by a utility, an electric cooperative, or any other entity as appropriate and as described herein. If the grid is determined not to be valid at block 824, then it is determined that an islanding condition has occurred and the grid is absent from the connection with the inverter.

Referring again to 814, if $\Delta f_c$ is decreasing, the controller may determine at block 816 whether a tank detection period overflow has occurred (e.g., whether a tank detection period has passed since start-up). If yes, the controller may proceed to a tank condition/no islanding state at block 822. If the controller determines that the tank detection period overflow has not occurred In some examples, the controller may again return to 804 and continue to calculate the command frequency. According to the example embodiment shown in FIG. 8, if a tank condition is detected by the controller and the controller determines that the grid is still connected, the method ends. In another example embodiment, if a tank condition is detected by the controller, the inverter is turned off and the controller determines whether the grid is valid. In the event that the grid is determined not to be valid, an islanding condition is detected and the power source connected to the inverter is removed from the grid. In one example embodiment, after passing a threshold time, such as 3-5 cycles in the mode where a locked frequency band is observed by the controller, the controller determines that the grid is disconnected and the inverter is shut off and a final islanding command is sent.

Performing the tests on the command frequency demonstrated in FIG. 8 may allow the controller to differentiate between islanding conditions and other situations where the $\Delta f_c$ is constant or locked. This may eliminate unnecessary disconnections of the inverter, which can disrupt power. In some examples, A "tank" condition, as described herein, may occur when the command frequency is considered to be constant, nonzero value, but it may some small deviation from the rated frequency, which is shown in FIG. 8 as being between 59.3 Hz and 60.5 Hz. For example, when the grid is operating with 60.1 Hz while the rated frequency is 60 Hz, the system may determine that a tank condition has occurred. Likewise, for an unstable grid, $f_c[n] \neq f_c[n-1]$ or, in other words, the frequency command of the inverter varies if the grid frequency is unstable. When an islanding condition occurs, the frequency command variation may be ($\Delta f_c$) locked at a value because it has lost the frequency information from the grid.

Advantageous features of the examples described herein may include (1) the ability to detecting islanding conditions by just adding a disturbance in the inverter frequency, as described herein, without adding any disturbance to other parameters such as voltage/current; and (2) without significant or any negative impact on the power quality, or efficiency of the system.

Figure 9:
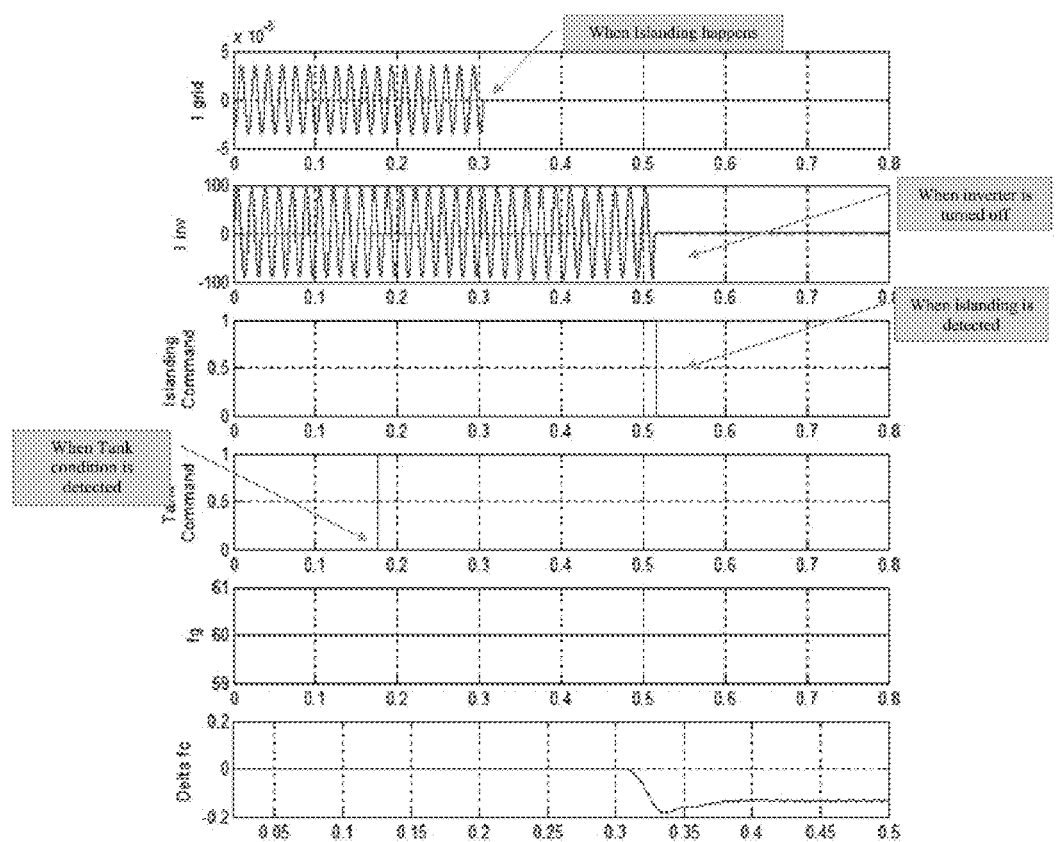
FIGS. 9-12 display graphs of simulation and emulation results for islanding detection and prevention in accordance with an example embodiment.

FIGS. 9-12 present software simulation information regarding examples of islanding condition detection described herein. FIG. 9 shows plots of various values over a 0.8 second range during which an islanding condition occurs. Grid current (I grid) is the current provided by the main power system. Inverter current (I inv) is the current provided to the grid by the DG source via its inverter or other suitable connection device. The grid frequency (fg) is the frequency of power on the grid. The command frequency variation (Delta fc or $\Delta f_c$) may be found as described herein, for example, with reference to Equation [7]. Tank Command may show when the controller indicates that a tank condition is present. For example, the tank command may be asserted when the command frequency property is met and may indicate that the controller will disconnect the DG system from the grid network to test for an islanding condition. Islanding Command may show when the controller detects an islanding condition. For example, the islanding command may instruct the inverter to remove the DG system from the grid network.

In FIG. 9, the grid frequency is constant at 60 Hz throughout the displayed period. As described herein, this may indicate either that no islanding condition exists, or that the power and the load are closely matched. The command frequency variation, $\Delta f_c$, is also constant from zero through about 0.31 seconds. Because $\Delta f_c$ is constant, the controller may detect a potential tank or islanding condition at about 0.18 seconds. As shown by the grid current at 0.18 seconds, however, no islanding condition exists because the grid current is non-zero. In response to the tank command, the controller may disconnect the DG system from the grid network at about 0.51 seconds and test for an islanding condition. As shown, an islanding condition began at about 0.3 seconds. Accordingly, when the controller measures the grid current at about 0.51 seconds, it may detect no current and conclude that an islanding condition exists. Accordingly, the controller may maintain the DG system in a state disconnected from the grid.

Figure 10:
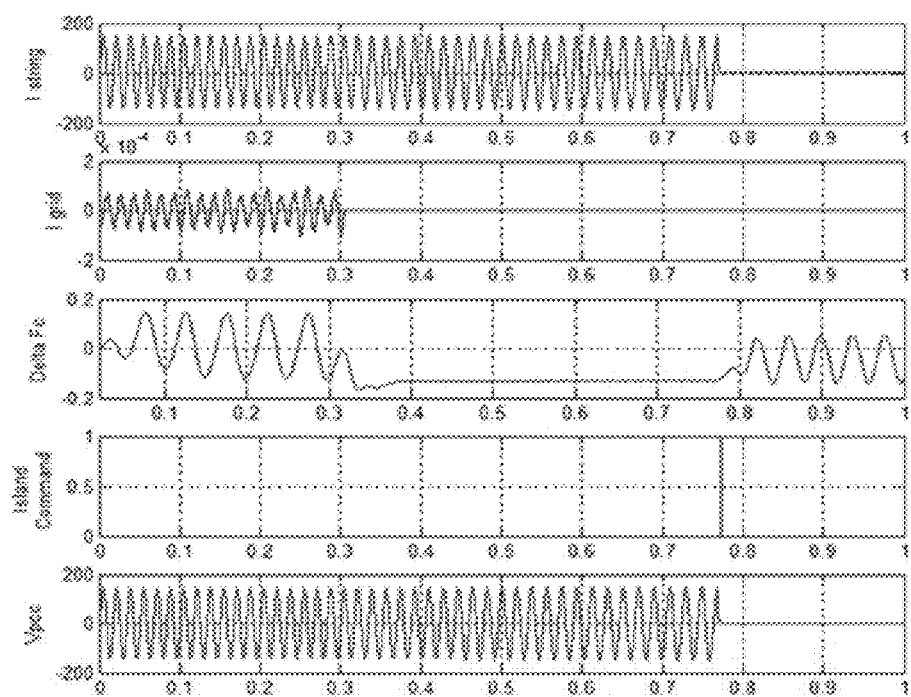

FIG. 10 shows an example modeling a string of inverters, for example, as illustrated in FIGS. 3 and 4. Accordingly, in FIG. 10, the current provided by the string of inverters is indicated by I string. In the example of FIG. 10, an islanding condition occurs at 0.3 seconds, which is indicated by the grid current going to zero. When the islanding condition occurs, the command frequency variation drops to at locks at a small negative value of a little less than −0.2 Hz. The command frequency variation remains approximately constant for a little over four tenths of a second until about 0.75 seconds. At 0.75 seconds, the controller determines a potential islanding condition and issues an islanding command to the inverter, indicating that the DG system should be disconnected from the grid network. The DG system is disconnected from the grid network, as shown by the inverter current dropping to zero at about 0.75 seconds. When the DG system is disconnected, the controller may test the grid current. Upon finding that the grid current is zero, the controller may maintain the DG system in a state disconnected from the grid. As shown in FIG. 10, while the inverter frequency command frequency was varied, the voltage of the power source, measured by the voltage at the point of common coupling (shown as $V_{pcc}$), was not varied. Thus, only the command frequency of the inverter was changed in response to the islanding condition.

Figure 11:
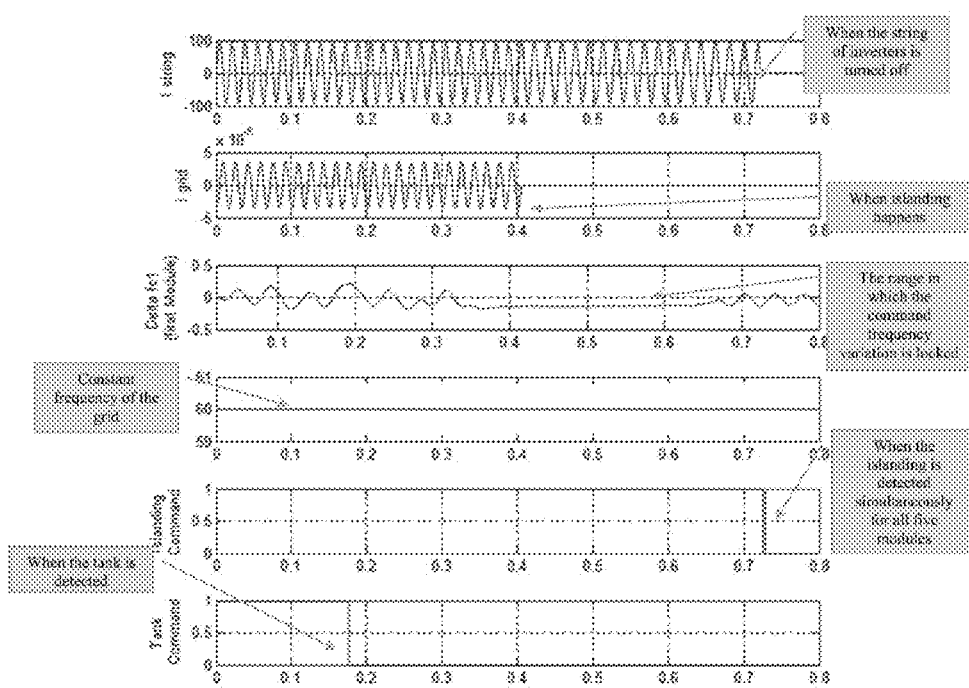

Referring to FIG. 11, the grid frequency is constant at 60 Hz throughout the displayed period. This may indicate either that no islanding condition exists, or that the power and the load are closely matched (e.g., a tank condition). The command frequency variation may be within a threshold range measured by the controller such that a tank condition is detected at about 0.18 seconds. An islanding condition may begin after the tank condition is detected (at about 0.4 seconds). In response to the detection of the tank condition, the controller may disconnect the DG system from the grid network at about 0.72 seconds, and the islanding condition may be detected shortly thereafter.

Figure 12:
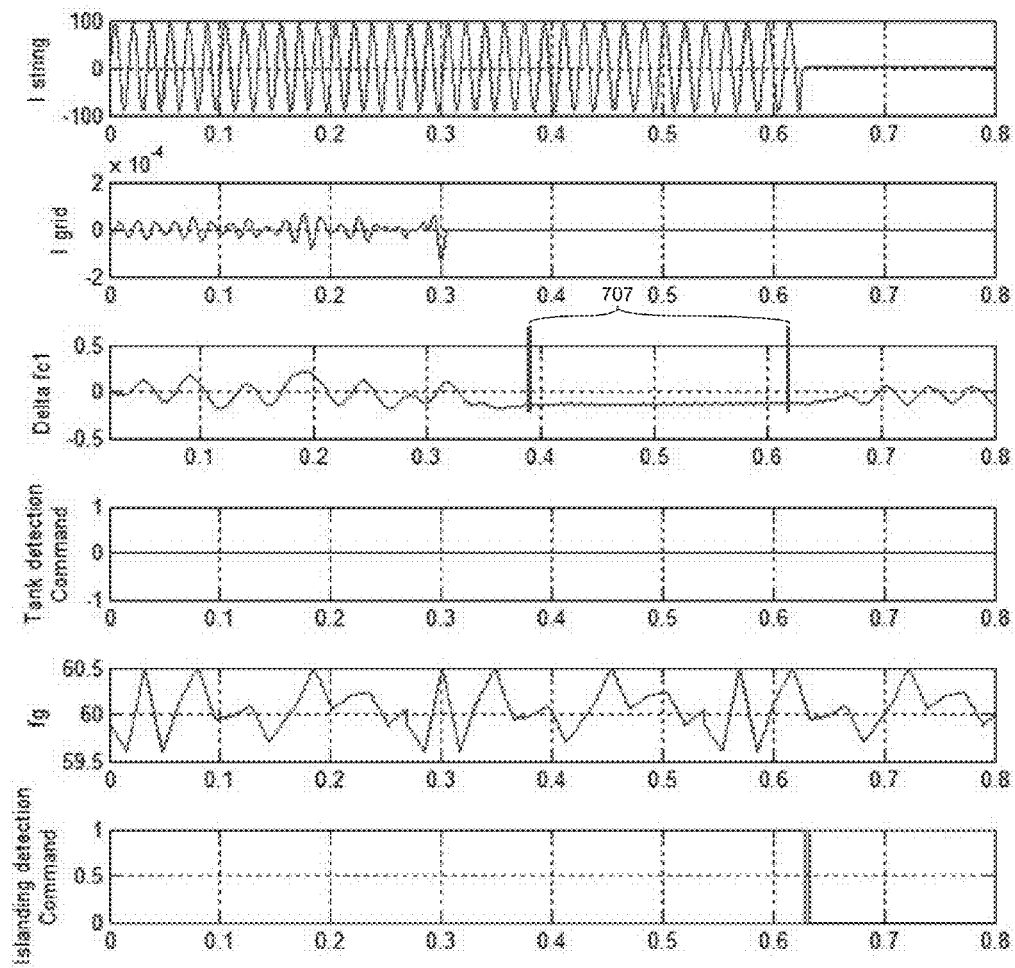

FIG. 12 shows an example where the grid frequency varies within an acceptable range (e.g., $59.3<f_g<60.5$) and the DG system-generated power is matched closely to the load demand, resulting in a negligible grid current. To model the frequency variation, the real-time data set of grid frequency in the lab has been used. Accelerating coefficient, α (See Equation [3]) is set to 4.5, and K=2 (See Equation [1]). It should be noted that with increasing a, the required time to detect islanding will be increased as the contribution of error in equation will be magnified causing bigger variations in the command frequency. The threshold to command frequency variation lock is set to be 1 mHz ($\epsilon_f[n]$=0.001 Hz), and based on the IEEE 1547 standard, it may be necessary for algorithm to detect islanding in less than 2 seconds (in one example embodiment). As shown in FIG. 12, the frequency of the inverters are commanded to be varied from time 0-0.8 s but the $\Delta f_c$, becomes locked or constant starting at about 0.4 s. At 0.62 s, the inverters are turned off and because the measured grid current, $I_{grid}$, is 0 A, an islanding condition has been detected at 0.62 s and the islanding detection command is provided.

Figure 13:
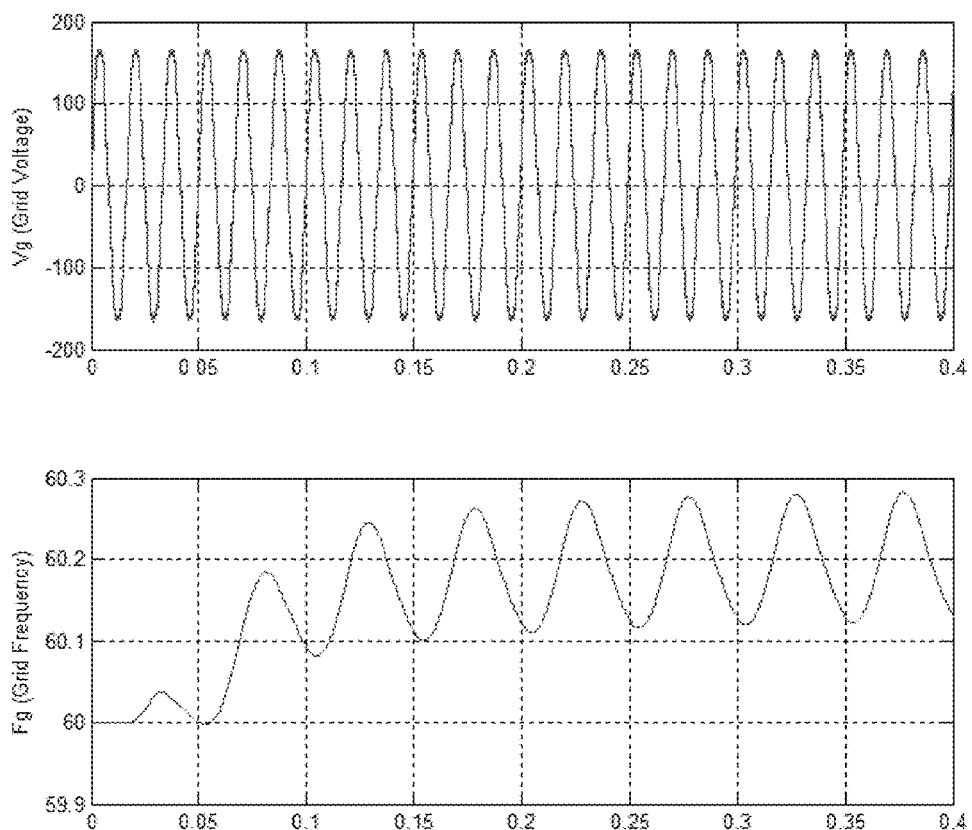
FIGS. 13-22 display graphs of simulation, emulation, and measurement results for islanding detection and prevention in accordance with additional example embodiments.
Figure 14:
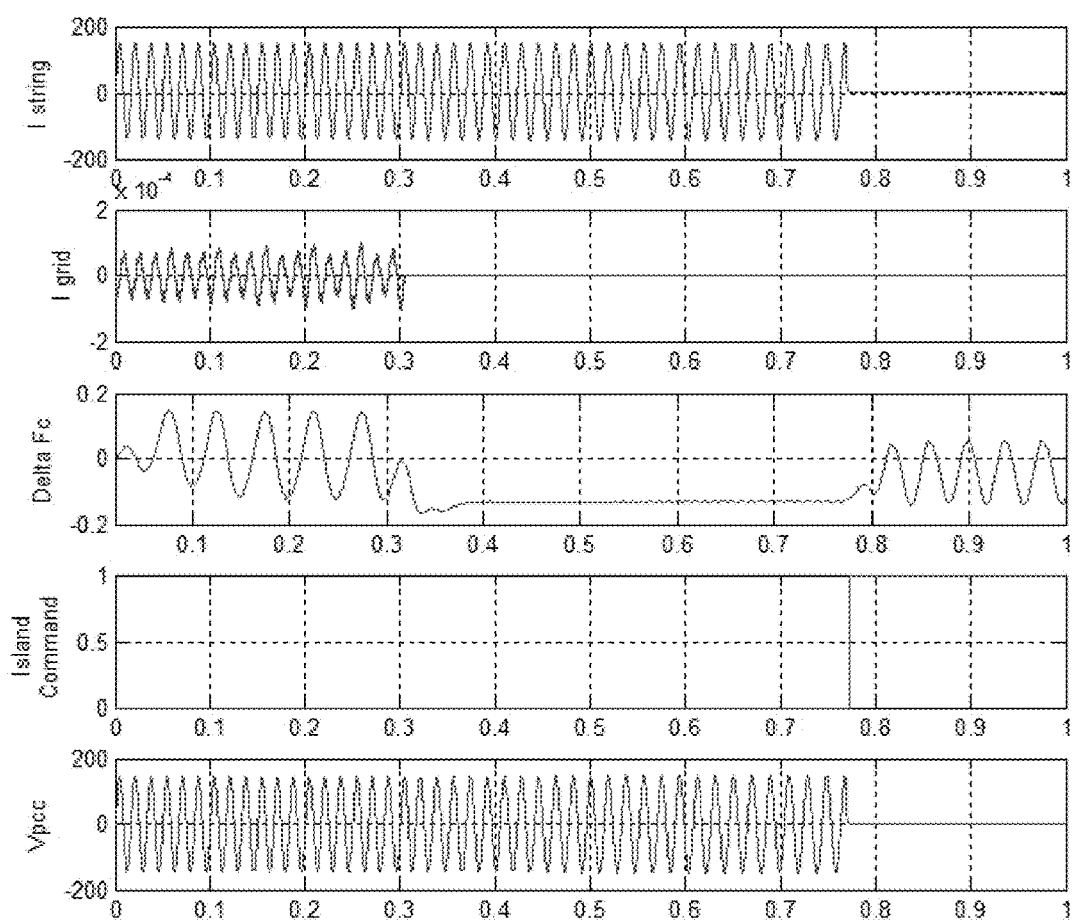

FIGS. 13 and 14 show simulation results when a quality factor for the load of the power grid, is <2. FIG. 13 shows grid voltage (Vg) and grid frequency Fg while FIG. 14 shows the current from a string of inverters (I string), grid current (I grid), command frequency variation (Delta Fc), island command and voltage at the point of common coupling ($V_{pcc}$). As seen in FIG. 14, the load matches closely to the generating power resulting in very small current in the grid. The grid frequency oscillates around 60.2 Hz with the small ripple less than 0.2 Hz. As shown in FIG. 14, after an islanding condition occurs at t=0.3 sec, the command frequency variation, $\Delta f_c$, becomes locked at a small negative value. When the command frequency variation remains locked or constant for a threshold number of sample cycles (for example, 10 cycles in FIG. 14), the DG system is disconnected from the grid network. Any suitable threshold number of cycles may be used. In some examples, the threshold number of cycles may be determined based on the sampling time and the switching frequency of the system, which may vary. In some examples, the DG may be turned off for ten (10) cycles.

Figure 15:
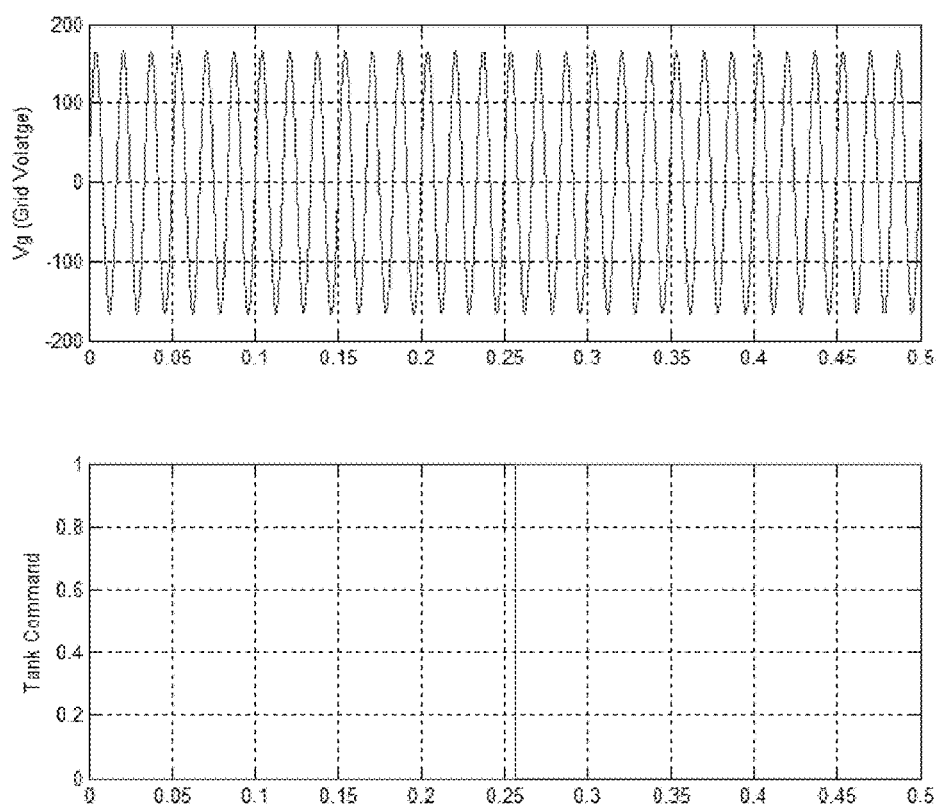
Figure 16:
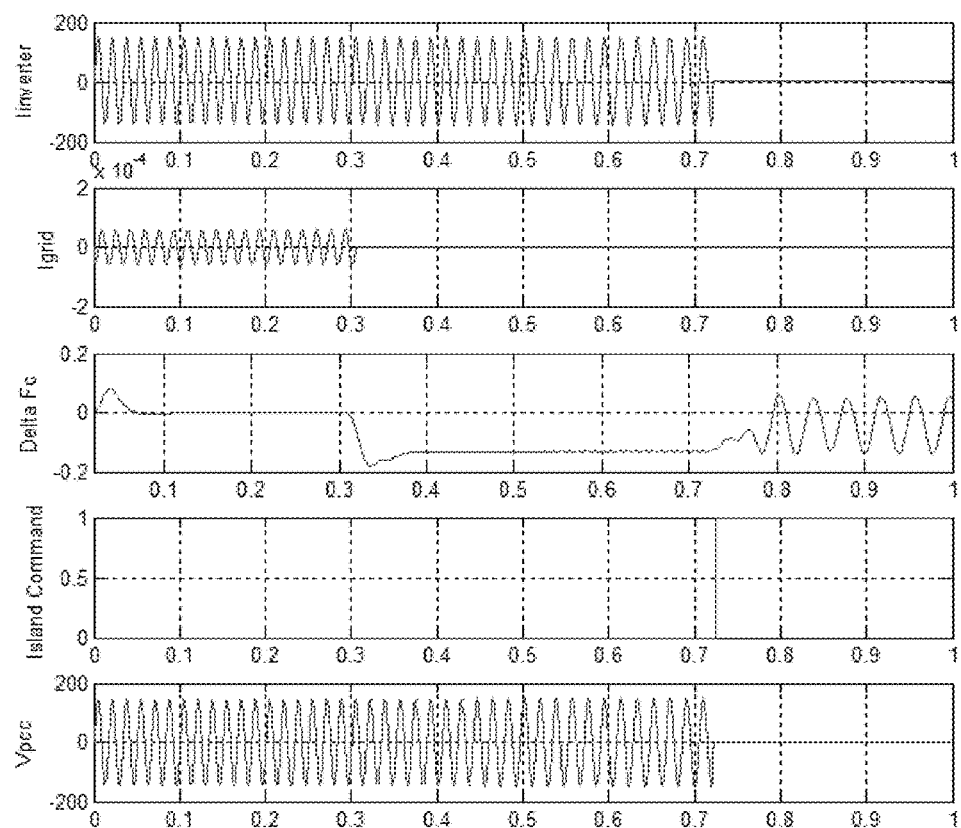

FIG. 15 displays a grid voltage with a constant grid frequency of about 60.1 Hz. The frequency tolerance is set to 0.1 Hz (not shown in FIG. 15), with respect to a rated frequency, shown as 60 Hz. Referring now to FIG. 16, an islanding condition begins at about 0.3 seconds, illustrated by the grid current reducing to zero. Before the islanding condition occurs, however, the command frequency variation is constant at a value of about zero from about 0.05 seconds to the beginning of the islanding condition at about 0.3 seconds (e.g., $\Delta f_c \cong 0$ during that period). This may indicate a tank condition (e.g., a close matching between the power source and the load). The non-changing command frequency variation may be an indicator of the potential tank condition and may result in the controller setting a tank flag or command at about 0.25 seconds after initializing the circuit, as shown in FIG. 15. Also, as an islanding condition happens at t=0.3 sec, this event is also detected around 0.72 sec which is a faster than the previous state with variable grid frequency. Faster detection is the cause of the initial lower oscillation in the grid frequency. An islanding condition can be discriminated with a tank condition when the command frequency variations, $\Delta f_c$, become consistently negative, and the command frequency is still locked. Although the command frequency variation begins to oscillate after about 0.72 seconds, this may not indicate that the islanding condition no longer exists at least because the DG system has already been disconnected from the grid network.

Example controllers described here may also be programmed to detect over/under voltage (OV/UV) and over/under frequency (OF/UF) conditions for a utility. OV/UV and OF/UF conditions may also indicate an islanding condition. For example, when a controller detects an OV/UV or OF/UF condition, it may disconnect its DG system from the grid network. OV/UV and OF/UF conditions may be defined in any suitable manner according to any suitable standard. For example, a voltage trip limit may specify threshold change in the grid voltage over a specified time period. One example voltage trip limit set forth in the UL1741 standard may be exceeded if the grid voltage varies by ±10% in less than 2 sec. Also, for example, a frequency trip limit may specify a minimum and maximum frequency for the grid. One example frequency trip limit set forth in the UL1741 standard is $59.3<f_g<60.5$, within a maximum of 10 cycles of disturbance.

Figure 17:
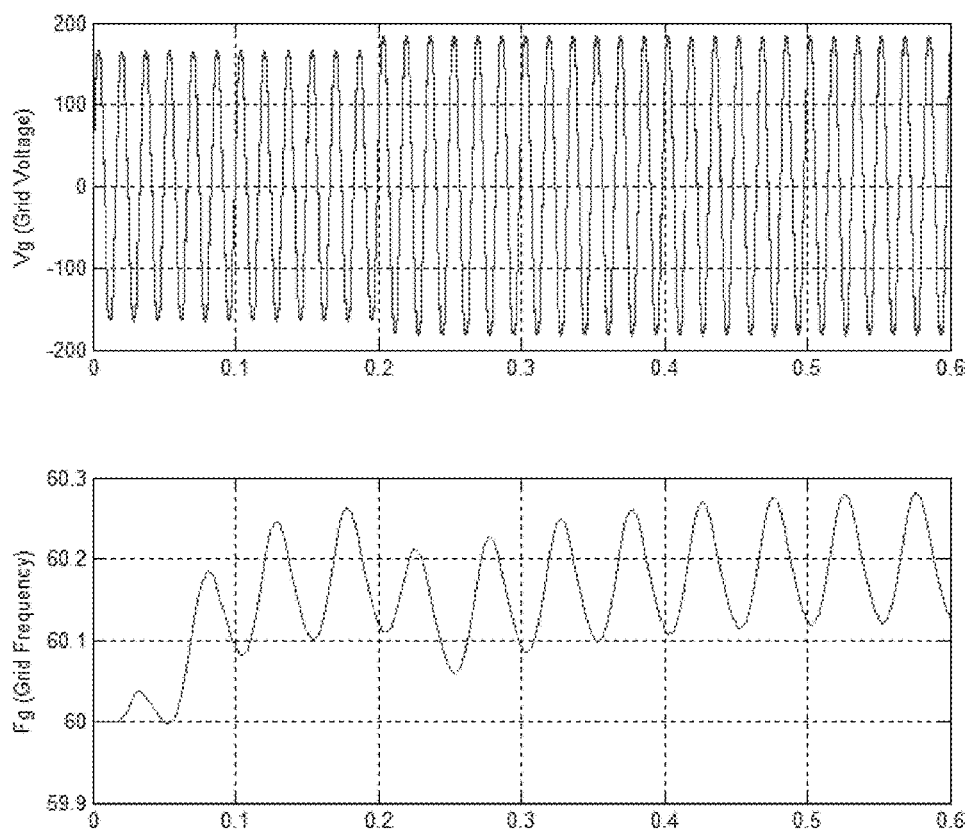
Figure 18:
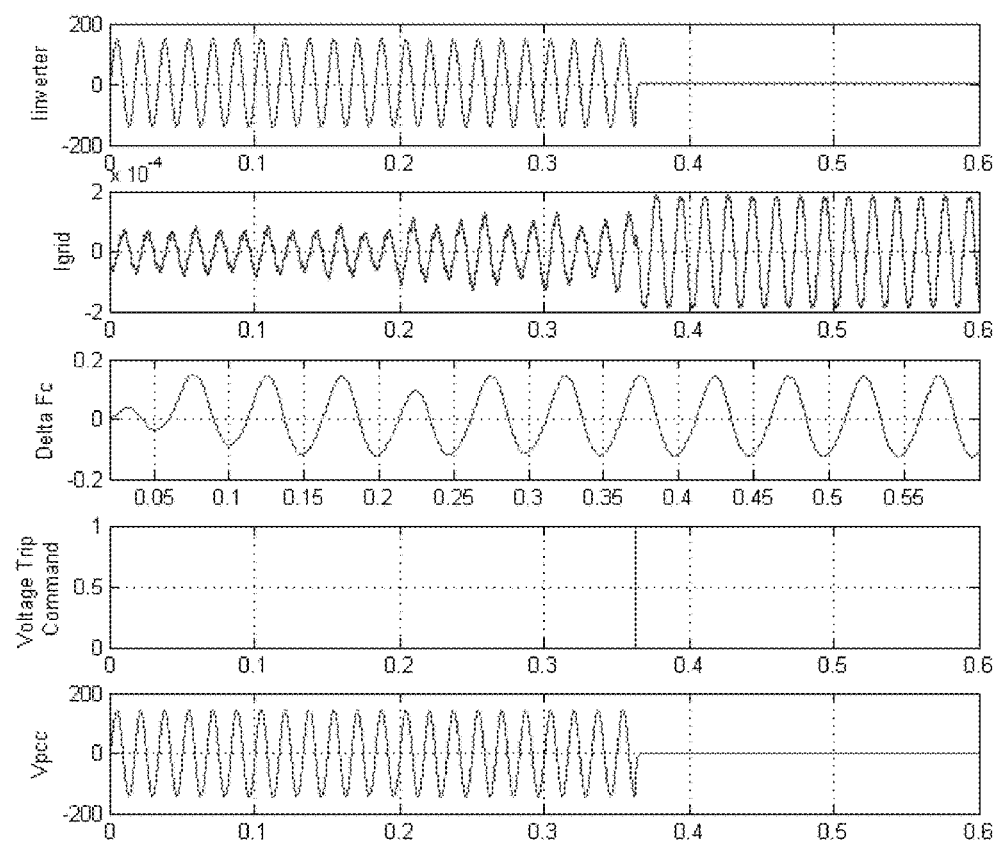
Figure 19:
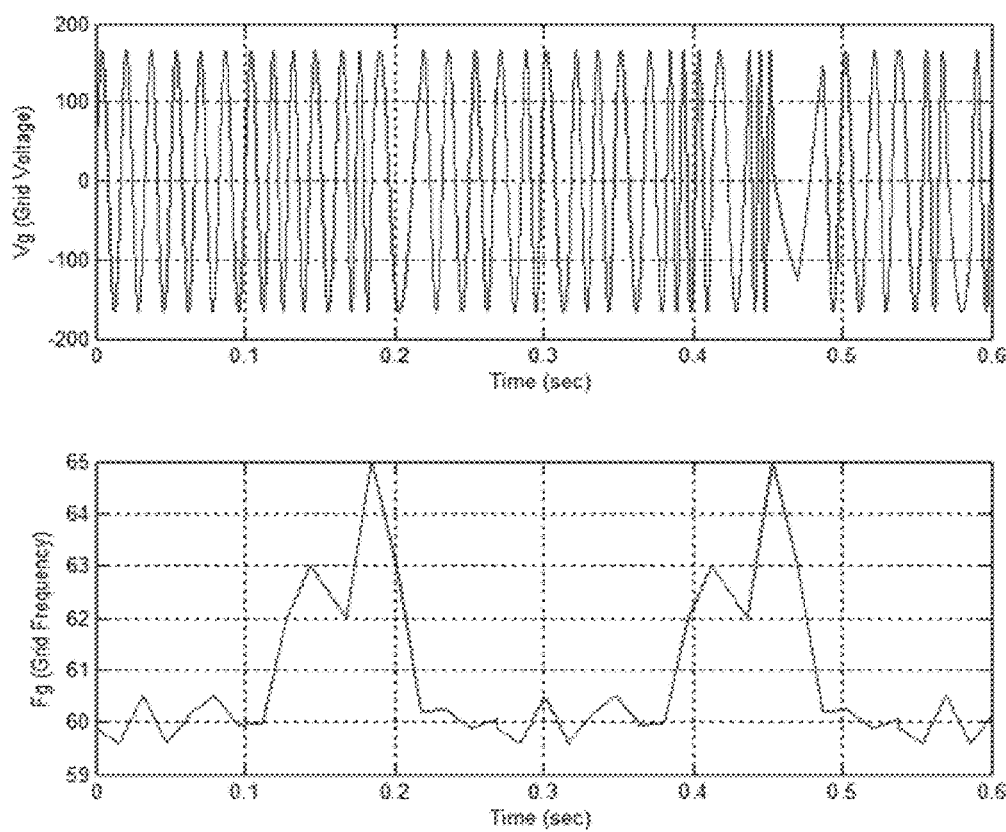
Figure 20:
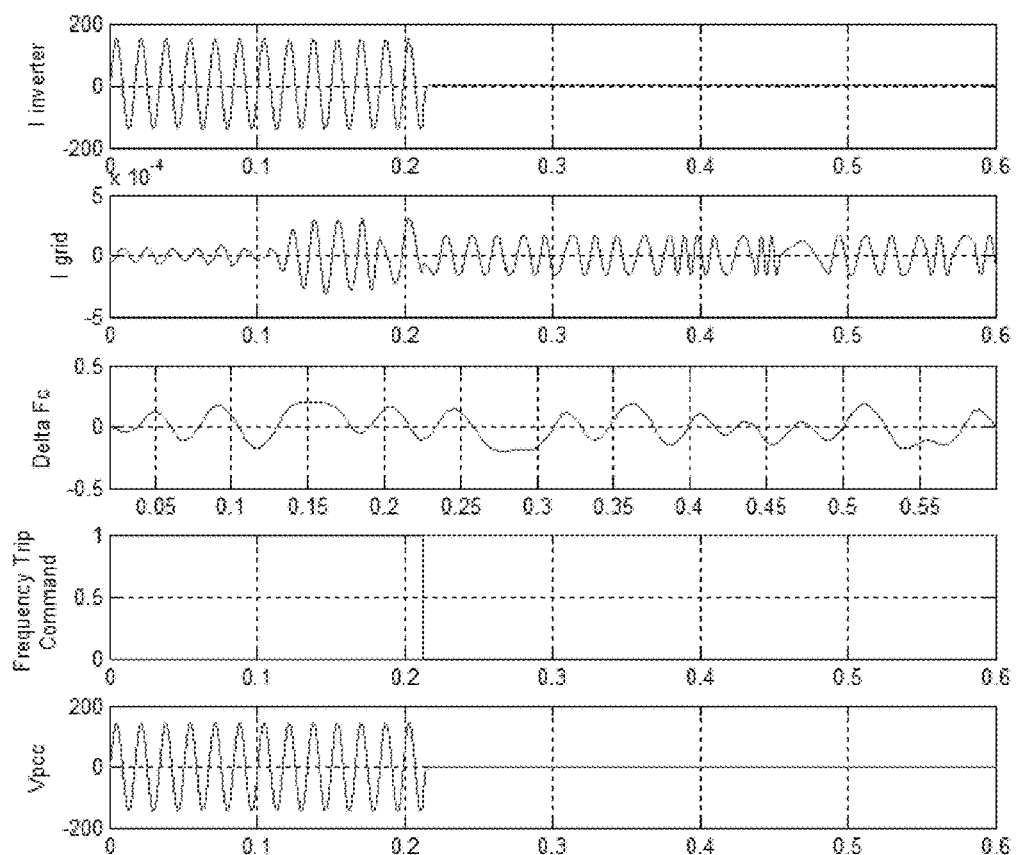

Referring to FIG. 17, a 12% overvoltage (OV) occurs at 0.2 seconds. As it can be seen in the FIG. 17, the voltage is increased at t=0.2 sec from 110 $V_{rms}$ to 123.2 $V_{rms}$. The controller may detect the overvoltage and disconnect the DG system from the grid. FIG. 18 shows an example where an overvoltage occurs at about 0.3 seconds. The controller may issue a voltage trip command at 0.37 seconds, turning off the inverter. The same controller can be used for under voltage protection (UVP) with defining 10% voltage drop as the lower trip off limit. In the examples shown in FIGS. 17 and 18, the grid frequency variation may not exceed applicable frequency trip limits. For example, the grid frequency variations may not exceed the acceptable range $59.3<f_g<60.5$. FIGS. 19 and 20 show an example where an over-frequency condition occurs at about 0.12 seconds (see grid frequency shown in FIG. 19). FIG. 20 shows the response of the controller to the over-frequency condition. The controller may detect the over-frequency condition and shut down the DG system accordingly at about 0.21 seconds.

Figure 21:
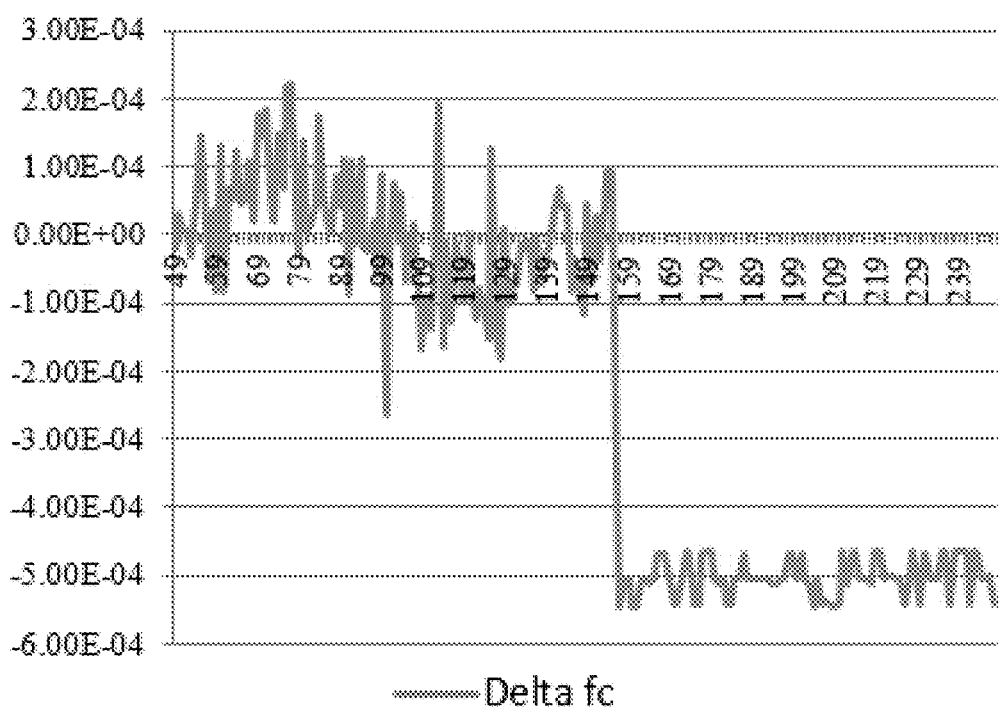

FIG. 21 demonstrates simulation results showing a small command frequency variation $\Delta f_c$ regarding the sampled time for an example embodiment of the present disclosure. FIG. 21 shows the real-time hardware in the loop (HIL) results of a grid-tied (110 Vrms, 60 Hz), single phase inverter obtained by Typhoon-HIL 600 emulator in which the proposed algorithm (e.g., the process flow 1020 of FIG. 24) has been applied to detect islanding. The HIL emulator has the ability to define the scaling factor such that the output waveforms can be visible in the screen. In this case, the scaling factor is set to be 40, scaling down the peak of the grid voltage from 155 Vpeak to 3.88 Vpeak as utilized for the emulation described above.

Figure 22:
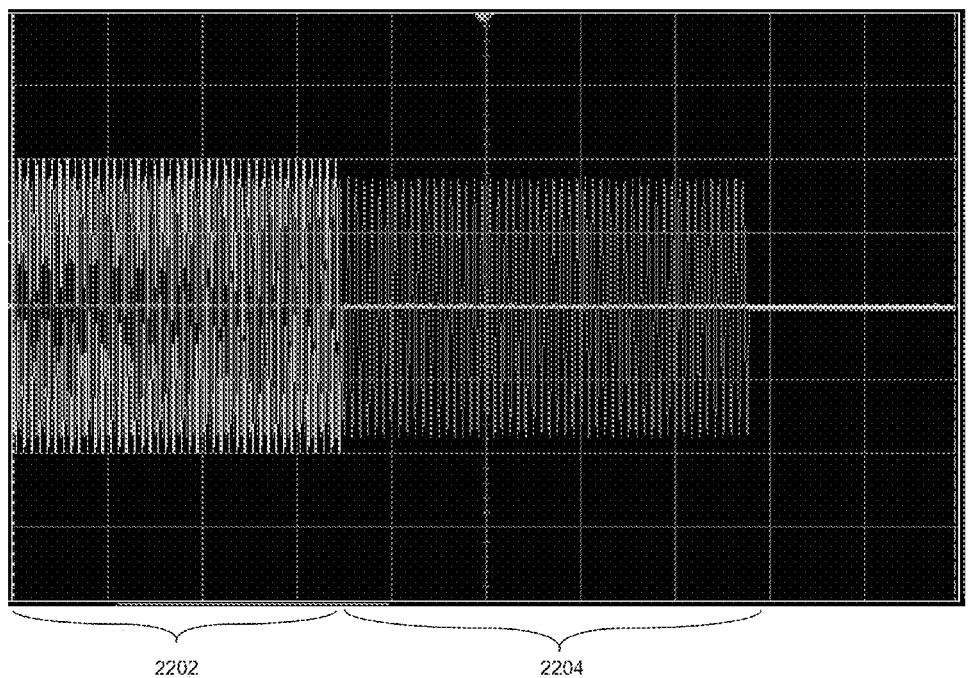

An example grid voltage 2202 and inverter voltage 2204 are shown in FIG. 22. A worst case scenario in which grid has a fixed frequency was assumed. As shown, when the grid frequency is constant, a range of variations in $\Delta f_c$ is considerably smaller because there is no inherent perturbation in the frequency, and consequently islanding detection will be more difficult. Despite this difficulty, when islanding happens, the command frequency variation ($\Delta f_c$) becomes considerably smaller, and it is kept consistently positive or negative depending on the sign of frequency error.

$\Delta f_c$ becomes locked at −0.0005 Hz which is consistently negative after an islanding condition happened, while it was oscillating around zero before that. The $\Delta f_c$ value is very small even before the islanding condition occurred because the grid frequency is stable and it is set at 60 Hz, which is equal to the rated frequency. FIG. 22 displays experimental results showing that an islanding condition is detected 0.85 sec after occurrence of the islanding condition, and the inverter gets turned off. FIG. 22 shows that inverter is turned off 0.85 sec after an islanding condition occurs.

Although examples described here utilize command frequency variation to detect islanding conditions, some examples may also utilize the phase at the PCC. For example, the general representation of a sinusoidal field quantity is as follows:

$$i(t)=A \sin(2\pi ft+\varphi(t)) \qquad [8]$$

In Equation [8], A is the amplitude of the waveform, f is the frequency and φ is the phase angle of the waveform. The examples described herein utilize the dithering of the command frequency of the inverter to determine the extent and the presence of any tank condition and/or islanding condition in the grid network. For example, dithering the command frequency may include varying the command frequency, as described above. In a tank condition, leading or lagging reactive power and active power may be balanced by the load and the grid network frequency of the inverter may be locked to that of the natural frequency of the network or the resonant tank frequency. Any amount of dithering of the command frequency may not result in any change in the frequency of the final waveform due to the inherent resonant circuit. Various examples described herein utilize this principle associated with a typical resonant network to detect the presence and the extent of the resonant circuit.

In some examples, however, a controller may also utilize the phase angle at the PCC to detect islanding conditions. For example, when the power and load are balanced (e.g., in a high quality factor resonant circuit), the resultant phase angle of the signal provided to the grid network at the inverter, e.g., at the PCC, may be small and/or zero. Accordingly, the controller may identify a tank and/or an islanding condition by checking for phase angle lock in a manner similar to the way that the controllers described herein check for command frequency lock. Phase angle lock may occur, for example, if the phase angle remains constant and/or within a locking phase band (e.g., ±8° resulting in a minimum allowable power factor (pf) of leading or lagging 0.99 under unity pf operation) and for a threshold time period (e.g., 1.5-1.7 seconds). If the controller is able to adequately vary the phase angle then the network may not be resonant to result in tank condition detection. If, however, the phase angle magnitude remains smaller than a prescribed threshold (ideally zero, practically some small angle) the controller may determine the presence of a resonant grid network or tank condition, disconnect the DG system from the grid, and determine whether the grid is valid, as described herein. In some examples, using the phase angle may incur longer averaging operations which in turn may lead to delayed response of deactivation of the DG system from the grid under islanded conditions. In some examples, frequency and phase may be utilized in conjunction with one another to improve the diagnosis of the presence of resonant conditions. One example embodiment may utilize phase variation after frequency dithering resulted in a small and constant change in commanded frequency. The combination of the two parameters for detection of resonant grid conditions may further reduce the occurrences of DG deactivation to check for grid validity. This in turn may improve power quality of the grid network and increases energy harvest from the energy source connected to the DG.

Figure 23:
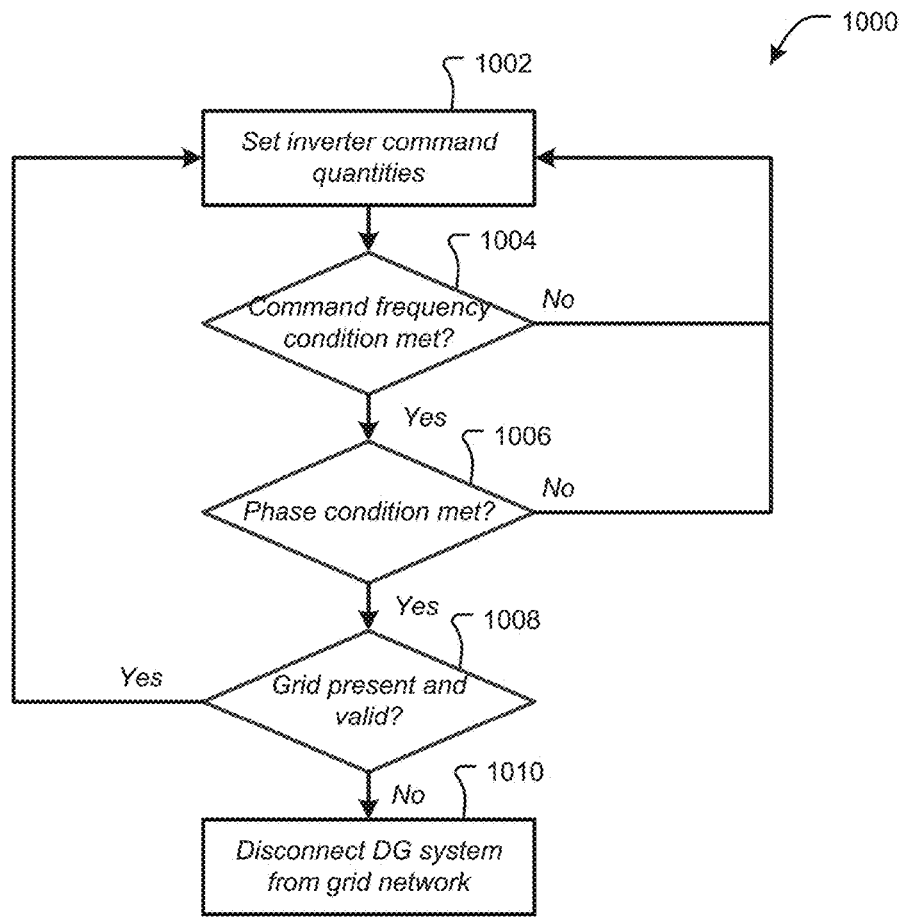
FIG. 23 is a flow chart showing one example of a process flow that may be executed by a controller to detect islanding conditions utilizing phase angle.

FIG. 23 is a flow chart showing one example of a process flow 1000 that may be executed by a controller to detect islanding conditions utilizing phase angle. As described, the phase angle may be used to detect islanding in conjunction with or not in conjunction with the command frequency. The controller may be any suitable controller, including the example controllers described herein such as, for example, the controller 202. At block 1002, the controller may set command quantities of an inverter connecting a DG system to a power grid network. Command quantities of the inverter may include the command frequency, as described herein. The inverter and DG system may be of any suitable type. For example, the DG system may be or comprise the energy conversion device 214. The inverter, for example, may be an inverter of the control circuit 216 described herein above. Any suitable command quantities of the inverter may be set. For example, the controller may set a command phase and a command frequency of the inverter. The command frequency may be determined, as described herein above. In some examples, command frequency may be kept in synchronism with the grid frequency without additional disturbance injection as described herein, but may allow for dithering of the phase alone. In another example, both the frequency and the phase may be perturbed, for example, based on system response requirements.

Optionally, at block 1004, the controller may determine if a command frequency condition (e.g., a locking frequency condition) has been met after issuance of the command frequency and injection of appropriate disturbance for the same as described herein. A command frequency condition may be any condition of the command frequency or a command frequency variation that indicates a potential islanding condition, for example, as described herein (e.g., command frequency variation is within a locked frequency band, etc.). If the command frequency condition frequency condition is not met, it may indicate that an islanding condition is not present. Accordingly, the controller may return to block 1002 and continue to send command quantities for the inverter.

If the command frequency condition is met, then controller may determine, at block 1006, whether a phase condition or conditions are met (which may indicate a potential tank and/or islanding condition). The phase condition may be met, for example, if a variation in the phase at the PCC is within a locking phase band. A locking phase band may be a range of values for the phase at the PCC that indicate a potential tank condition and/or islanding condition. For example, a locking phase band may be centered on zero. In some examples, the controller may also periodically sample the phase of the signal at the PCC. Although various examples described herein measure the phase at the PCC, in some examples, the phase may be found at other suitable locations in the system between the inverter and the electrical grid network. If the phase condition or conditions are not met at block 1006, the controller may return to 1002 and continue to send command quantities for the inverter. If the phase condition is met at block 1006, the controller may, at block 1008, disconnect the DG system from the grid network and determine whether the grid (e.g., the main power system) is present and valid, as described herein. If yes, the controller may return to 1002 and continue to send command quantities for the inverter. If no, the controller may disconnect the DG system from the grid at block 1010. In some examples, after the DG system is disconnected from the grid, the controller may periodically test the grid to determine if the grid has again become present and valid. If so, the controller may reconnect the DG system to the grid network.

In the example of FIG. 23, command frequency and the phase at the PCC are utilized to detect islanding conditions. In some examples, phase may be used to detect islanding conditions without also checking the command frequency. For example, 1004 may be omitted. The controller may then proceed directly from 1002 to 1006. If a phase condition is determined to be met at block 1006, the controller may, at block 1008, disconnect the DG system from the grid network and determine whether the grid is present and valid. If a locking phase condition is not met at block 1006, the controller may return to 1002 and continue to send command quantities for the inverter. Also, in some examples, the process flow 1000 of FIG. 23 may be executed in conjunction with (OFP/UFP), as described herein. For example, the controller may compare either the grid frequency or the command frequency to a threshold frequency range for the grid network.

Figure 24:
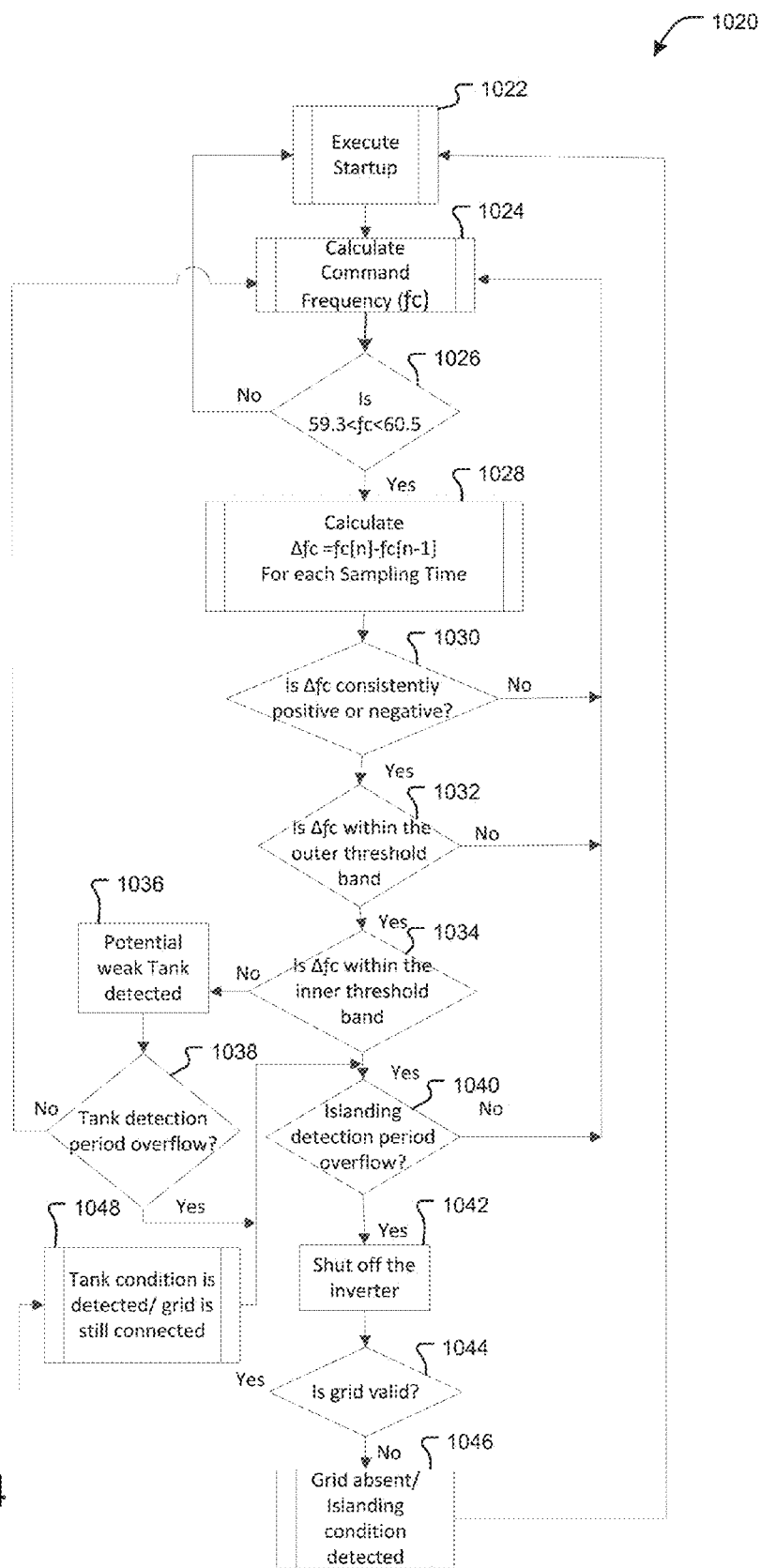
FIG. 24 is a flow chart showing one example of a process flow that may be executed by a controller to detect an islanding condition.

FIG. 24 is a flow chart showing another example of a process flow 1020 that may be executed by a controller to detect an islanding condition. At block 1022, the controller may execute a startup routine. According to the start-up routine, the DG system may make preparations to provide power to the grid. At block 1024, the controller may calculate the command frequency, for example, as described herein. Once the command frequency is calculated, at block 1026 the command frequency may be compared to an initial frequency range to determine if it is within that range. For example, if the command frequency is outside of a threshold frequency range (e.g., the rated range of the grid), it may not be applied to the inverter and therefore the grid. Instead, the controller may return to startup at block 1022 where the power source and inverter remain disconnected from the power grid. For example, when the grid frequency is outside of the threshold frequency range, it may indicate that an islanding condition exists. If the command frequency does fall within the threshold frequency range at block 1026, then the command frequency may be applied to the inverter and the distributed generation source connected to the grid. A value, $\Delta f_c$, may be calculated at block 1028, for example, as described herein, for example, with respect to Equations [1]-[7]. Upon calculating $\Delta f_c$, at block 1030, the controller may determine whether $\Delta f_c$ is consistently positive or negative. For example $\Delta f_c$ may be considered to be consistently positive if it is above zero for a threshold time and/or a threshold number of samples. Similarly, $\Delta f_c$ may be considered consistently negative if it is below zero for a threshold time and/or for a threshold number of samples.

If the controller determines that $\Delta f_c$ is not consistently positive or negative at block 1030, for example, if it is alternating in polarity, then the controller may return to 1024 and continue to calculate the command frequency. If the controller determines that $\Delta f_c$ is consistently positive or negative, this may used as a proxy for the $\Delta f_c$ being zero (applying a hysteresis band around zero). The controller may proceed to 1032. At block 1032, the controller may determine whether $\Delta f_c$ is within an outer threshold band. Any suitable outer threshold band may be chosen including, for example, 0.5 Hz. If $\Delta f_c$ is not within the outer threshold band, the controller may again return to 1024 and continue to calculate the command frequency. If $\Delta f_c$ is within the outer threshold limit in block 1032, then, at block 714, the controller may determine whether $\Delta f_c$ is within an inner threshold band in block 1034. Any suitable inner threshold band may be chosen including, for example, 0.2 Hz.

If the controller determines that $\Delta f_c$ is not within an inner threshold limit in block 1034, the controller may determine, at block 1036, that a potential weak tank condition is present. A weak tank condition may occur when the provided power and the load are similar, but not the same. A weak tank condition may be indicated when the $\Delta f_c$ is consistently positive or negative and within the outer threshold band, but not within the inner threshold band. In some examples, a weak tank condition may indicate a potential islanding condition if the weak tank condition persists for more than a threshold period. To test this, the controller may determine, at block 1038, whether a weak tank condition has persisted for more than an overflow period. The overflow period may be a time since a weak tank condition as first detected. For example, the controller may record a timestamp each time it detects a weak tank at block 1036. The total time of the weak tank may be a difference between a first timestamp indicating a weak tank condition and the most recent time stamp indicating a weak tank condition. If the total time exceeds a threshold, the controller may treat the weak tank as a potential islanding condition. In some examples, a weak tank condition may be considered a potential islanding condition if it persists for a threshold number of cycles of the process flow 1020. For example, if the process flow reaches block 1036 for a predetermined number of times, a potential islanding condition may be detected. In some examples, the controller may detect a potential islanding condition only if a weak tank condition has existed continuously or substantially continuously for a predetermined time and/or number of cycles of the process flow 1020. For example, if the controller executes the process flow 1020, but does not reach block 1036, it may reset the time or number of cycles for finding a potential islanding condition.

If a potential islanding condition is determined at block 1038 or if the $\Delta f_c$ is within the inner threshold band at block 1034, then the controller may determine at block 1040 if an islanding detection period has expired. Similar to what was described with respect to block 1038, expiration of the islanding detection period may be determined by considering at time or number of cycles of the process flow 1020 since the controller first reached block 1040. If the islanding detection period is in overflow, the inverter may be disconnected from the grid at block 1040. The controller may shut off the inverter and/or otherwise disconnect the DG system from the grid at block 1042 and determine whether the grid is valid at block 1044. This can be determined based on whether the grid is providing a current or voltage from a main power source that is normally feeding the grid. The main power source may be a power source that is provided by a utility, an electric cooperative, or any other entity as appropriate and as described herein. If the grid is not determined to be valid at block 1044, then the controller may maintain the inverter in a state that disconnects the DG system from the grid network. Also, for example, at block 1046, the controller may indicate the presence of an islanding condition and may again proceed to 1022.

If the grid is valid at block 1042, the controller may proceed to 1048, which may indicate that a tank condition is present, however, the grid is valid. Still, the existence of the tank condition may mask any islanding conditions that subsequently develop. Accordingly, the controller may proceed from 1048 to 1040, where it is again determined if the islanding detection period has passed.

Figure 25:
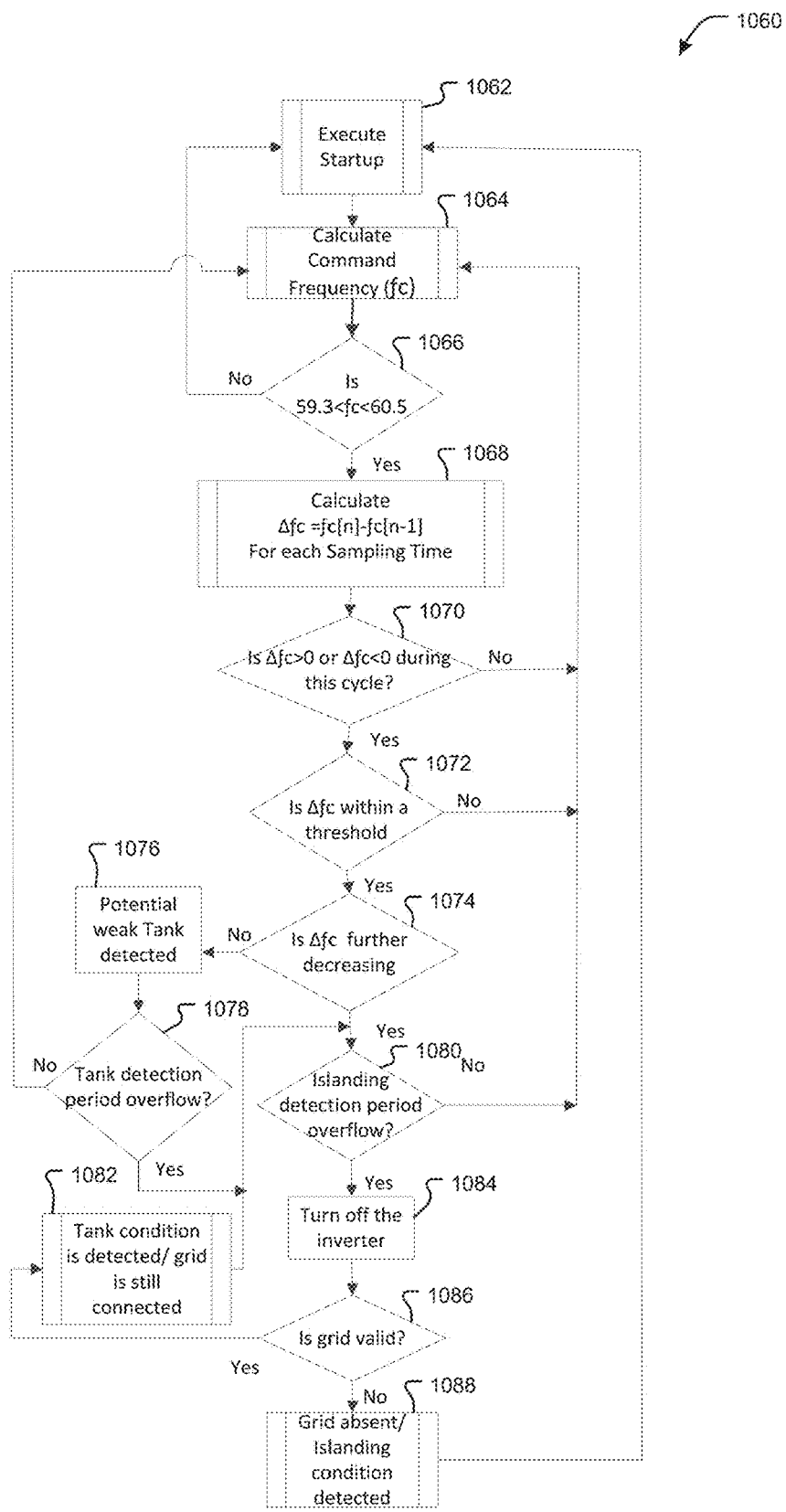
FIG. 25 is a flow chart showing one example of a process flow that may be executed by the controller to detect islanding conditions.

FIG. 25 is a flow chart showing one example of a process flow 1060 that may be executed by the controller to detect islanding conditions. At block 1062, the controller may execute a startup routine. According to the start-up routine, the power source may make preparations to provide power to the grid. At block 1064, the controller may calculate the command frequency, for example, as described herein. Once the command frequency is calculated, at block 1066 the command frequency is compared to a threshold frequency range to determine if it is within that range (e.g., 59.3 Hz-60.5 Hz). For example, if the command frequency is outside of the rated range of the grid (e.g., 59.3 Hz-60.5 Hz), it may not be applied to the inverter and therefore the grid. Instead, the controller may return to startup at block 1062 where the power source and inverter remain disconnected from the power grid. A value of the command frequency variation, $\Delta f_c$, may be determined at block 1068, for example, as described herein above with respect to Equations [1]-[3]. The controller may calculate $\Delta f_c$ as $f_c[n]-f_c[n-1]$ for each sampling time.

Upon calculating $\Delta f_c$ at block 1068, the controller may determine, at block 1070, whether $\Delta f_c$ is greater than or less than 0 for a threshold time, for example one or more cycles (1 Hz), and/or a threshold number of samples. If the controller determines that $\Delta f_c$ is not greater than or less than 0, then the controller may return to 1064 and continue to calculate the command frequency. If the controller determines that $\Delta f_c$ is greater than or less than 0, and hence not zero, the controller may proceed to block 1072. At block 1072, the controller may determine whether $\Delta f_c$ is locked within a threshold. For example, the $\Delta f_c$ may be considered locked within a threshold if it remains constant, or changes by less than a threshold amount (e.g., number of Hz) during a threshold time or number of cycles. In some examples, the threshold time may be 1.5 seconds. If the controller determines that $\Delta f_c$ is not locked in a value, then the controller may again return to 1064 and continue to calculate the command frequency. If the controller determines that $\Delta f_c$ is locked within the threshold, then the controller may proceed to block 1074 and determine whether $\Delta f_c$ is further decreasing. For example, when $\Delta f_c$ is within the threshold, it may indicate that it is small or decreasing. If $\Delta f_c$ is further decreasing, it may indicate a match between the generated power and the load that, as described herein, could indicate a tank condition and/or an islanding condition.

If at block 1074, $\Delta f_c$ is not determined to have a decreasing value, the controller may determine whether an islanding detection period is in overflow, at block 1080 (e.g., whether the islanding detection period has elapsed since startup). If the islanding detection period is not in overflow, then the controller may return to 1064 and continue to calculate the command frequency. If the islanding detection is in overflow (e.g., more than an islanding detection period has passed), the inverter may be disconnected from the grid at block 1084. The controller may determine at block 1086 whether the grid is valid. This can be determined based on whether the grid is providing a current or voltage from a main power source that is normally feeding the grid. The main power source may be a power source that is provided by a utility, an electric cooperative, or any other entity as appropriate and as described herein. If the grid is determined not to be valid at block 1086, then it is determined that an islanding condition has occurred and the grid is absent from the connection with the inverter. If the grid is valid at block 1086, then the controller may proceed to a tank condition/grid connected state 1082. From there, the controller may proceed to 1080, as described herein. For example, if the system remains in the tank condition/grid connected state 1082 for more than a threshold period, it may indicate an islanding condition. This makes it useful to periodically turn off the inverter (block 1084) and determine if the grid is valid (block 1086).

Referring again to block 1074, if $\Delta f_c$ is decreasing, the controller may determine at block 1076 that a weak tank condition may have occurred, for example, as described herein. The controller may then, at block 1078, determine whether a tank detection period overflow has occurred (e.g., whether a tank detection period has passed since start-up). For example, the tank detection overflow period may be longer than the thresholds described herein at 1070 and 1072. If yes, the controller may proceed to block 1080, as described. If the tank detection period has not passed, the controller may return to block 1064 and continue to calculate the command frequency, as described herein.

As would be appreciated by someone skilled in the relevant art(s), part or all of one or more aspects of the methods and system discussed herein may be distributed as an article of manufacture that itself comprises a computer readable medium having computer readable code means embodied thereon.

The computer readable program code means is operable, in conjunction with a computer system, to carry out all or some of the steps to perform the methods or create the system discussed herein. The computer readable medium may be a recordable medium (e.g., hard drives, compact disks, EPROMs, or memory cards). Any tangible medium known or developed that can store information suitable for use with a computer system may be used. The computer-readable code means is any mechanism for allowing a computer to read instructions and data, such as magnetic variations on a magnetic media or optical characteristic variations on the surface of a compact disk. The medium can be distributed on multiple physical devices (or over multiple networks). For example, one device could be a physical memory media associated with a terminal and another device could be a physical memory media associated with a processing center.

The computer devices, systems, and servers described herein each contain a memory that will configure associated processors to implement the methods, steps, and functions disclosed herein. Such methods, steps, and functions can be carried out, e.g., by processing capability on mobile device, terminal, network processor, or by any combination of the foregoing. The memories could be distributed or local and the processors could be distributed or singular. The memories could be implemented as an electrical, magnetic or optical memory, or any combination of these or other types of storage devices. Moreover, the terms "memory", "memory storage", "memory device", or similar terms should be construed broadly enough to encompass any information able to be read from or written to an address in the addressable space accessed by an associated processor.

Aspects of the present disclosure discussed with regards to and shown in FIGS. 1-11, or any part(s) or function(s) thereof as appropriate, may be implemented using hardware, software modules, firmware, tangible computer readable media having instructions stored thereon, or a combination thereof and may be implemented in one or more computer systems or other processing systems.

The functions of the various functional elements, logical blocks, modules, and circuits elements described in connection with the example embodiments disclosed herein may be implemented in the general context of computer executable instructions, such as software, control modules, logic, and/or logic modules executed by the processing unit. Generally, software, control modules, logic, and/or logic modules comprise any software element arranged to perform particular operations. Software, control modules, logic, and/or logic modules can comprise routines, programs, objects, components, data structures and the like that perform particular tasks or implement particular data types. An implementation of the software, control modules, logic, and/or logic modules and techniques may be stored on and/or transmitted across some form of computer-readable media. In this regard, computer-readable media can be any available medium or media useable to store information and accessible by a computing device. Some example embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the example embodiments described herein illustrate example implementations, and that the functional elements, logical blocks, modules, and circuits elements may be implemented in various other ways which are consistent with the described example embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual example embodiments described and illustrated herein has discrete components and features which may be readily separated from or combined with the features of any of the other several example embodiments without departing from the scope of the present disclosure. Any recited method can be carried out in the order of events recited or in any other order which is logically possible.

It is worthy to note that any reference to "one example embodiment" or "an example embodiment" means that a particular feature, structure, or characteristic described in connection with the example embodiment is comprised in at least one example embodiment of the present disclosure. The appearances of the phrase "in one example embodiment" or "in one example embodiment" in the specification are not necessarily all referring to the same example embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

Additionally, It is worthy to note that some example embodiments may be described using the expression "coupled" and "connected" along with their derivatives. These terms are not intended as synonyms for each other. For example, some example embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are comprised within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, example embodiments, and example embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present disclosure, therefore, is not intended to be limited to the exemplary example embodiments and example embodiments shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as when it was individually recited herein. All methods described herein can be performed in any suitable order unless otherwise indicated herein or otherwise clearly contradicted by context. The use of any and all examples, or exemplary language (e.g., "such as," "in the case," "by way of example") provided herein is intended merely to better illuminate the disclosed example embodiments and does not pose a limitation on the scope otherwise claimed. No language in the specification should be construed as indicating any non-claimed element essential to the practice of the claimed subject matter. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or example embodiments disclosed herein are not to be construed as limitations. Each group member may be referred to and claimed individually or in any combination with other members of the group or other elements found herein. It is anticipated that one or more members of a group may be comprised in, or deleted from, a group for reasons of convenience and/or patentability.

Although the various example embodiments of the devices have been described herein in connection with certain disclosed example embodiments, many modifications and variations to those example embodiments may be implemented. For example, different types of end effectors may be employed. Also, where materials are disclosed for certain components, other materials may be used. The foregoing description and following claims are intended to cover all such modification and variations.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A system for detecting an islanding condition at a distributed generation system, the system comprising:
    a distributed generation system comprising at least one photovoltaic system;
    an inverter electrically coupled to the distributed generation system to connect the distributed generation system to an electrical grid network;
    a controller in communication with the inverter, wherein the controller comprises at least one processor and is programmed to:
        periodically sample a grid frequency of the electrical grid network;
        filter a first sample of the grid frequency to determine a filtered grid frequency for the first sample;
        determine a command frequency for the first sample by summing:
            a filtered grid frequency for the first sample; and
            a value proportional to a difference between the filtered grid frequency for the first sample and the grid frequency for the first sample;
        send the command frequency for the first sample to the inverter;
        determine a difference between the command frequency for the first sample and a command frequency for a second sample immediately preceding the first sample to generate a command frequency variation;
        determine that the command frequency variation has been within a locking frequency band for more than a threshold time period, wherein the threshold time period is less than two seconds;
        instruct the inverter to disconnect the distributed generation system from the electrical grid network;
        determine that the electrical grid network at the inverter is not disconnected from a main power system; and
        instruct the inverter to re-connect the distributed generation system to the electrical grid network.

2. The system of claim 1, wherein the controller is further programmed to execute over frequency protection/under frequency protection (OFP/UFP) by:
    determining that the command frequency for the first sample is outside of a threshold frequency range for the grid network; and
    instructing the inverter to disconnect the distributed generation system from the electrical grid network.

3. The system of claim 1, wherein the controller is further programmed to:
    periodically sample a phase of a signal at a point of common coupling (PCC) between the inverter and the electrical grid network; and
    determine that the phase has been within a locking phase band for more than a second threshold time period, wherein the second threshold time period is less than two seconds.

4. The system of claim 3, wherein the controller is programmed to determine that the phase has been within the locking phase band for more than the second threshold time period before instructing the inverter to disconnect the distributed generation system from the electrical grid network.

* * * * *